United States Patent
Stoa et al.

(10) Patent No.: US 12,403,587 B2
(45) Date of Patent: Sep. 2, 2025

(54) HYBRID SENSOR HEAD FOR SURFACE INSPECTION AND METHOD OF USE

(71) Applicant: Equanostic AS, Oslo (NO)

(72) Inventors: Stig Stoa, Oslo (NO); Andreas Reason Dahl, Oslo (NO); Oyvind Lunde Hodneland, Oslo (NO); Tore Lie Sirevaag, Oslo (NO)

(73) Assignee: Equanostic AS, Oslo (NO)

( * ) Notice: Subject to any disclaimer, the term of this patent is extended or adjusted under 35 U.S.C. 154(b) by 0 days.

(21) Appl. No.: 18/996,516

(22) PCT Filed: Sep. 7, 2023

(86) PCT No.: PCT/IB2023/058851
§ 371 (c)(1),
(2) Date: Jan. 17, 2025

(87) PCT Pub. No.: WO2024/052847
PCT Pub. Date: Mar. 14, 2024

(65) Prior Publication Data
US 2025/0258138 A1    Aug. 14, 2025

(30) Foreign Application Priority Data

Sep. 8, 2022   (GB) ..................... 2213172

(51) Int. Cl.
*G01N 29/04*       (2006.01)
*G01B 17/02*       (2006.01)
(Continued)

(52) U.S. Cl.
CPC ........... *G01N 29/041* (2013.01); *G01N 22/02* (2013.01); *G01N 29/07* (2013.01); *G01N 29/265* (2013.01);
(Continued)

(58) Field of Classification Search
CPC .......... G01B 17/00–08; G01S 7/00–52; G01S 13/00–95; G01S 15/00–96; G01H 5/00;
(Continued)

(56) References Cited

U.S. PATENT DOCUMENTS 4,955,235 A    9/1990  Metala et al.
5,333,502 A *  8/1994  Clark, Jr. ............. G01N 29/265
                                                    73/866.5
(Continued)

FOREIGN PATENT DOCUMENTS

CN    109483561 A    3/2019
CN    208703412 U    4/2019
(Continued)

OTHER PUBLICATIONS

Guan, L., Cong, X., Zhang, Q., Liu, F., Gao, Y., An, W., & Noureldin, A. (2020). A Comprehensive Review of Micro-Inertial Measurement Unit Based Intelligent PIG Multi-Sensor Fusion Technologies for Small-Diameter Pipeline Surveying. Micromachines, 11(9), 840. https://doi.org/10.3390/mi11090840 (Year: 2020).*

(Continued)

*Primary Examiner* — Vladimir Magloire
*Assistant Examiner* — Remash R Guyah
(74) *Attorney, Agent, or Firm* — Dinsmore & Shohl LLP

(57) ABSTRACT

A hybrid sensor head (12) for inspecting a surface includes a casing (28) supporting at least one pair of pulse transceivers emitting respective pulses through a medium at different propagation speeds toward the surface and for receiving therefrom respective reflected pulses. The transceivers (50, 57) in each pair are configured to emit respective pulses to a common location of the surface and are mutually displaced such that a respective round-trip propagation distance for each pair of pulses differs by a known amount. At least two measurements are obtained from each pair of sensors at different times allowing computation of range and velocity for each transceiver.

14 Claims, 14 Drawing Sheets

(51) Int. Cl.
*G01N 22/02* (2006.01)
*G01N 29/07* (2006.01)
*G01N 29/265* (2006.01)
*G01S 13/88* (2006.01)
*G01S 15/89* (2006.01)

(52) U.S. Cl.
CPC ........ *G01B 17/02* (2013.01); *G01N 2291/105* (2013.01); *G01N 2291/2636* (2013.01); *G01S 13/88* (2013.01); *G01S 15/89* (2013.01)

(58) Field of Classification Search
CPC ............. G01N 9/00; G01N 21/00–956; G01N 23/00–223; G01N 29/00–52; G01N 29/041; G01N 22/02; G01N 29/07; G01N 29/265; G01N 2291/105; G01N 2291/2636; G01V 1/00–42; G01V 3/00–38; F16L 55/26–28; B25J 19/00–06; H01Q 1/22–24
USPC ... 342/22, 25, 118, 127, 130, 133, 173, 179, 342/188, 195, 196, 357, 35, 8, 450–453, 342/457, 73, 579, 584–590, 599, 342/602–629, 633–636, 639, 642–644, 342/646–649, 659–665; 367/7, 11, 13, 367/25, 87–89, 99, 138, 140, 902; 374/137, 142–145; 600/437–439, 600/447–453, 459–481
See application file for complete search history.

(56) References Cited

U.S. PATENT DOCUMENTS

| | | | | |
|---|---|---|---|---|
| 5,892,163 | A | * | 4/1999 | Johnson ................. G01M 3/02 73/865.8 |
| 9,389,314 | B1 | * | 7/2016 | Boyer ...................... G01B 7/06 |
| 9,534,487 | B2 | | 1/2017 | Zeroug et al. |
| 11,098,583 | B1 | | 8/2021 | Sirevaag |
| 11,143,016 | B2 | | 10/2021 | Sirevaag et al. |
| 2019/0285555 | A1 | * | 9/2019 | Kueny ............... G01N 21/8851 |
| 2020/0262261 | A1 | | 8/2020 | Loosararian et al. |
| 2020/0284390 | A1 | | 9/2020 | Kwan |
| 2020/0284759 | A1 | | 9/2020 | Thompson et al. |
| 2021/0389257 | A1 | * | 12/2021 | Liu .................. G01N 23/20008 |

FOREIGN PATENT DOCUMENTS

| | | | | |
|---|---|---|---|---|
| CN | 209041858 | U | | 6/2019 |
| CN | 111895217 | A | * | 11/2020 ............. F16L 55/40 |
| CN | 112881513 | A | | 6/2021 |
| EP | 0301906 | A2 | | 2/1989 |
| JP | 2020105726 | A | * | 7/2020 |
| KR | 102091983 | B1 | | 3/2020 |

OTHER PUBLICATIONS

Zheng, Jun, Kenneth W.K Lui, and H.C So. âAccurate Three-Step Algorithm for Joint Source Position and Propagation Speed Estimation.â Signal processing 87.12 (2007): 3096â3100. Web. (Year: 2007).*

International Search Report and Written Opinion dated Nov. 29, 2023, pertaining to Int'l Patent Application No. PCT/IB2023/058851, 12 pgs.

Duran et al. "State of the Art in Sensor Technologies for Sewer Inspection", IEEE Sensors Journal, vol. 2, No. 2, Apr. 2002, pp. 73-81.

Sirevaag "Ultrasonic borehole logging", Expanding the processing of the ultrasonic measurements to improve the evaluation of logging behind the casing, Doctoral theses at NTNU, 2019:375, 164 pgs.

UKIPO Search Report dated Nov. 8, 2022, pertaining to GB Patent Application No. 2213172.6, 13 pgs.

International Preliminary Report on Patentability dated Jun. 27, 2024, pertaining to Int'l Patent Application No. PCT/IB2023/058851, 22 pgs.

* cited by examiner

HYBRID SENSOR HEAD FOR SURFACE INSPECTION AND METHOD OF USE

FIELD OF THE INVENTION

This invention relates generally to surface inspection robots and more particularly to a sensor head having two different types of sensors.

BACKGROUND OF THE INVENTION

Robots for inspection of pipelines and industrial surfaces are well-known. For example, US 2020/0262261 assigned to Gecko Robotics, Inc., discloses an inspection robot that includes a robot body and at least two sensors positioned to interrogate an inspection surface and are communicatively coupled to the robot body.

The two or more sensors, which may be of the same or different types, for example ultrasound and γ-ray, may serve to serially collect data from the same location, or to provide predictive sensing from a first sensor to determine if a second sensor should take data on the same location at a second time during a single run of the robotic vehicle. For example, an ultra-sonic sensor mounted on a leading sensor sled taking data on a location may determine that a γ-ray measurement should be taken for the same location by a sensor mounted on a trailing sensor sled configured to travel over the same location as the leading sensor. They may also provide redundant sensor measurements from a plurality of sensors located in leading and trailing locations (e.g., located on the same or different sensor sleds to repeat sensor data collection), and the like.

U.S. Pat. No. 4,955,235, discloses an apparatus and a method for simultaneously inspecting the walls of a tube with both ultrasonic and eddy current probes.

U.S. Pat. No. 5,333,502 discloses a method for monitoring the environment of a vessel using a robotic device, which travels within a hollow member and emits and receives ultrasonic waves and electromagnetic fields through a liquid contained in the vessel and outer containment walls of the vessel. Here also, differences in the absorptions of any emitted and received ultrasonic wave and eddy current differences in any emitted electromagnetic fields are used to determine flaws in the hollow member and containment walls, and properties of any particles in suspension in the liquid.

Eddy current probes are limited to conductive material or ferromagnetic materials at relatively close proximity, since depth of penetration of eddy currents is physically limited owing to the skin depth of the metal. Moreover, sizing and location are not accurate unless the probe is smaller than the material defect and in near physical contact.

It is also known to analyze the boundaries separating dissimilar materials such as liquids and solids. For example, in the field of oil and gas wells, it is known to process zero-order mode ($A_0$) antisymmetric flexural Lamb waveforms formed in the casing of a borehole to obtain an amplitude attenuation dispersion plot and a phase dispersion plot as functions of frequency as means to characterize the physical state of the casing and annular fill outside the casing. This technology is well-described in U.S. Pat. No. 9,534,487 assigned to Schlumberger Technology Corporation; and in U.S. Pat. Nos. 11,098,583 and 11,143,016 assigned to the present Applicant.

Ultrasound inspection based on this principle exploits the low attenuation of Lamb waves, which can propagate for a relatively long distance without losing much energy. However, it is effective only when the pipe contains liquid. The type of inspection robot to which some embodiments of the present invention is directed may be used to monitor underground water and wastewater and gas pipes operated by utility companies to distribute water and gas to consumers. These pipes are buried under roads, and access usually requires that part of the road be excavated and that the water or gas be shut down for the period of inspection and maintenance. This may also require that road access be denied to traffic until the pipe is replaced or repaired and the road resurfaced. This is highly inconvenient to motorists and consumers and the inconvenience may often be exacerbated by subsequent failures in proximate segments of the same pipe. This is common and is sometimes due to the fact that the same environmental conditions that give rise to a failure in one segment of pipeline will likely cause failure in an adjacent segment. Also, the very act of excavating and opening up a pipeline for the purpose of inspection may subject adjacent segments to vibration and movement that induce fracture further down the pipeline.

Excavation of road surfaces and opening up buried pipelines are thus expensive and inconvenient and it is clearly desirable to minimize both as much as possible. To this end, it would be desirable to employ a robot that is easily maneuvered into an already open segment of pipe and can be controlled for movement into adjacent segments thus obviating the need to excavate the road surface along an extended stretch in order to gain access to these segments. When inspecting water pipes, it is normal to empty the inspected segment of water and check the wall surface of the pipe and any joints when nominally dry. To do this, an upstream valve is first closed to prevent the inflow of water, and any water still in the pipe is pumped out. But dry pipes do not lend themselves to ultrasound inspection, since ultrasound propagates best at a solid/liquid interface. Only when it is confirmed that the wall surface of the pipe and joints appear to be intact, is the valve re-opened to allow water to enter the pipe, whereupon ultrasound inspection becomes feasible in order to check that there are no leaks i.e., any previous leaks have been repaired.

US 2020/0262261, to which reference has been made, has dual sensors which could conceivably be configured for separate inspection during wet and dry conditions. Thus, with reference to para. [0306] of the aforementioned document, it is noted that sensors may be modularly configured on the robotic vehicle to collect data on specific locations across the surface of travel, and repeat collection of data on the same surface location whereby two sensors serially collect data from the same location, either with the same sensor type or different sensor types. The sensors provide complementary data that may, if required, be used to determine properties of the surface more accurately than can be done with only a single sensor. However, each sensor still operates independently.

SUMMARY OF THE INVENTION

It is therefore an object of the invention to provide a hybrid-sensor head for a surface inspection robot wherein two sensors are employed in tandem so as to provide measurements that neither on its own will be able to provide.

This object is realized in accordance with a first aspect of the invention by a sensor head for inspecting a surface having the features of the respective independent claim.

Thus, in accordance with the first aspect of the invention there is provided a hybrid sensor head for inspecting a surface, the sensor head comprising:

a casing supporting at least one pair of pulse transceivers for respectively emitting pulses through a medium at different propagation speeds toward said surface and for receiving therefrom respective reflected pulses, the respective transceiver in each pair being configured to emit pulses to a common location of the surface and being mutually displaced such that a respective round-trip propagation distance for each pair of pulses differs by a known amount, at least one motor configured to displace the transceivers for scanning the surface in mutually orthogonal directions so as to direct said pulses to successive points along the surface, at least one positioning sensor for determining an instantaneous location in space of the respective transceiver in each pair, at least one processor coupled to the at least one positioning sensor, and to the respective transceivers in each pair, the at least one processor being configured to:
(a) control the transceivers in each pair to direct pulses toward successive points along the surface and receive therefrom respective reflected pulses;
(b) measure respective propagation times for successive pulses to travel to the surface and back to the respective transceiver; and
(c) use respective propagation times of each pair of pulses directed to a respective common location of the surface at different times to compute a range traversed by each pulse or a respective velocity of each pulse.

The sensor may be a standalone device connected to a robot either integrally to form a combined inspection system or retrofitted by a universal coupler to an existing robot.

The combination of radar and ultrasound detection operating in tandem in a single sensor head provides unexpected advantages, particularly but not only for inspection of pipelines that may need to be checked both when empty and filled with liquid. Both radar and ultrasonic sensors emit wide-band pulses with relative bandwidths that are similar for both modalities. This enables many of the signal processing techniques to be used interchangeably by the two sensor modalities and for readings from two different transceivers directed to a common location of the surface to be combined in a manner and with an accuracy that neither reading on its own is able to achieve. In this manner, the two transceivers operate in synergy as opposed to independently operated dual sensors as proposed in the prior art to which reference has been made above.

In accordance with a second aspect of the invention there is provided a method for determining a range from a first transceiver to a known location on a remote surface, the method comprising:
(a) measuring a total path propagation time for a first pulse emitted by the first transceiver and passing through a medium at a first propagation speed to reach said location and for a pulse reflected thereby to reach the first transceiver;
(b) measuring a total path propagation time for a second pulse emitted by a second transceiver displaced a known distance from the first transceiver and passing through said medium at a second propagation speed different to the first propagation speed to reach said location and for a pulse reflected thereby to reach the second transceiver;
(c) repeating both measurements so as to obtain at least two equations relating measured propagation time and respective range; and
(d) solving the equations to derive range traversed by each pulse or a respective velocity of each pulse through said medium.

While ultrasound propagates best at a solid/liquid interface, radio propagation in air-filled and porous sediments renders radar especially suitable for such environments. The longer wavelength of radio waves, compared to its complementary ultrasonic sensor, propagate further past the pipe outer wall, and may be used to inspect the pipe immediate surroundings using techniques known as ground penetrating radar.

By combining accurate IMU location estimates of the sensor head and pulse measurements, techniques such as synthetic aperture radar or synthetic aperture ultrasound can be applied.

The microcontroller can be programmed to determine properties of the wall surface of the pipeline using the pulse echo technique. Alternatively, the microcontroller can be configured to relay data to an external computer for data analysis. The external computer can be remote from the inspection system or can be located in the robot.

Once a pipe segmented is open, the inspection apparatus can be inserted into the pipe. In the case of corrective maintenance, i.e., intervening due to an already occurred pipe failure, the rationale for inspection is that neighboring pipe segments have likely been subject to the same conditions as the faulty pipe segment. Consequently, neighboring segments may be prone to similar failures in the near future. Expanding the intervention to proactively include other imminent failures is advantageous. For the case of routine inspection, surveying the pipe produces information which, combined with models, can predict the future need for intervention.

The solution allows pipeline inspection to assess the current condition of the pipe, as well as its immediate surroundings. The resulting insight can be used for condition-based maintenance, i.e. determining the need for intervention, thus reducing the maintenance cost and overall service downtime. External inspection of surface/near-surface is also possible to some degree. For example, the sensor head may perform ultrasonic scanning of cement bonding where there is solid or fluid on the outside of the pipe, while radar scanning may use GPR (ground-penetrating radar) techniques to measure the state of backfill. Yet another need for inspection is to facilitate documentation of newbuilds to ensure that the pipeline is intact, has full structural integrity, is securely welded, and covered in the proper backfill. Combined ultrasound and radar inspection can address these requirements.

Although our discussion so far has related principally to pipeline inspection, similar principles apply for the inspection of any planar or irregular surface. Thus, range can be derived by transmitting acoustic or radio signals to the surface and measuring the time for the reflected signal to reach the transmitter. The round-trip time from the instant of transmission to the instant of reflection is indicative of twice the range from the sensor to the surface and can easily be derived if the velocity of the signal is known. Pipe sensors of the type described above may be attached to a robot that is controlled to travel along the pipe, while the sensors rotate thus scanning the inner wall surface of the pipe. However, the same principles may be applied to scanning of a planar surface during linear movement along one axis of the surface while, at the same time, incrementally moving the sensor along a second axis of the surface, most typically orthogonal to the first axis. Depending on the dimensions of the robot, its displacement from the surface being inspected and the area of the surface, it may be possible to scan the required surface area by rotating the sensor about the first axis. Alternatively, a flat-bed scanning sensor arrangement may be employed whereby the sensor moves along a transverse axis during axial propagation of the robot in a longitudinal direction.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 14b is an image showing combined synthetic aperture radar and ultrasound responses from the arrangement shown in FIG. 14a;

DETAILED DESCRIPTION OF EMBODIMENTS

In the following description of some embodiments, identical components that appear in more than one figure or that share similar functionality will be referenced by identical reference symbols.

Figure 1:
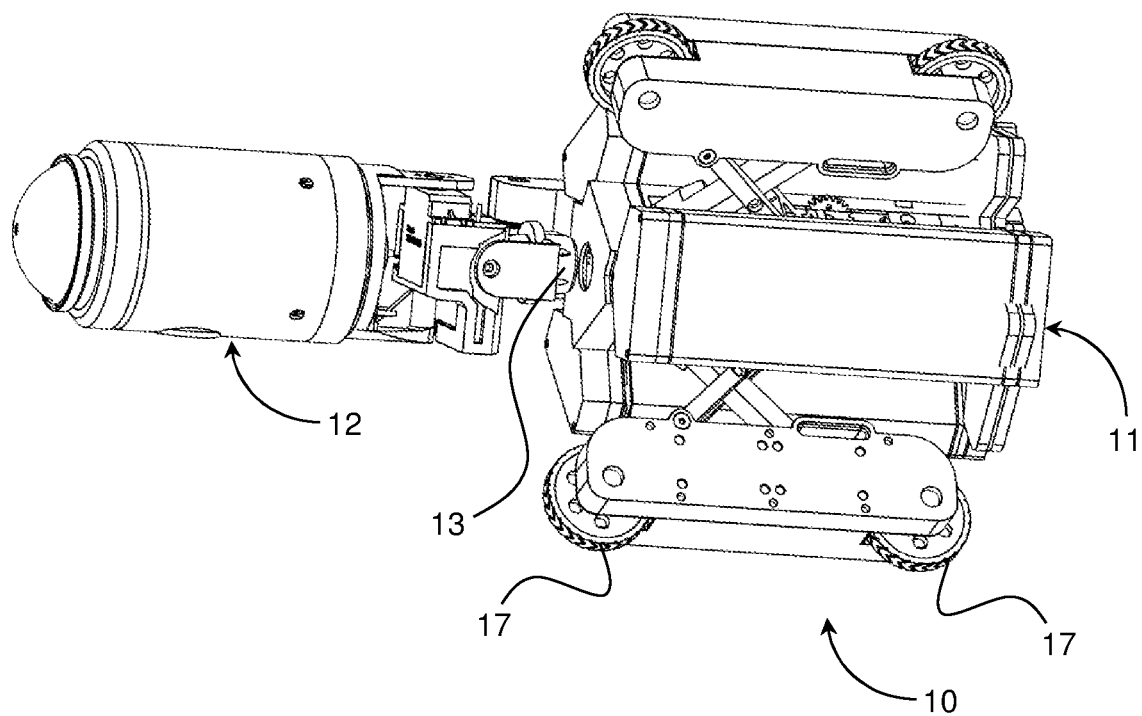
FIG. 1 is a perspective view of a pipe-inspection system comprising a robot coupled to a sensor head according to the invention.
Figure 2:
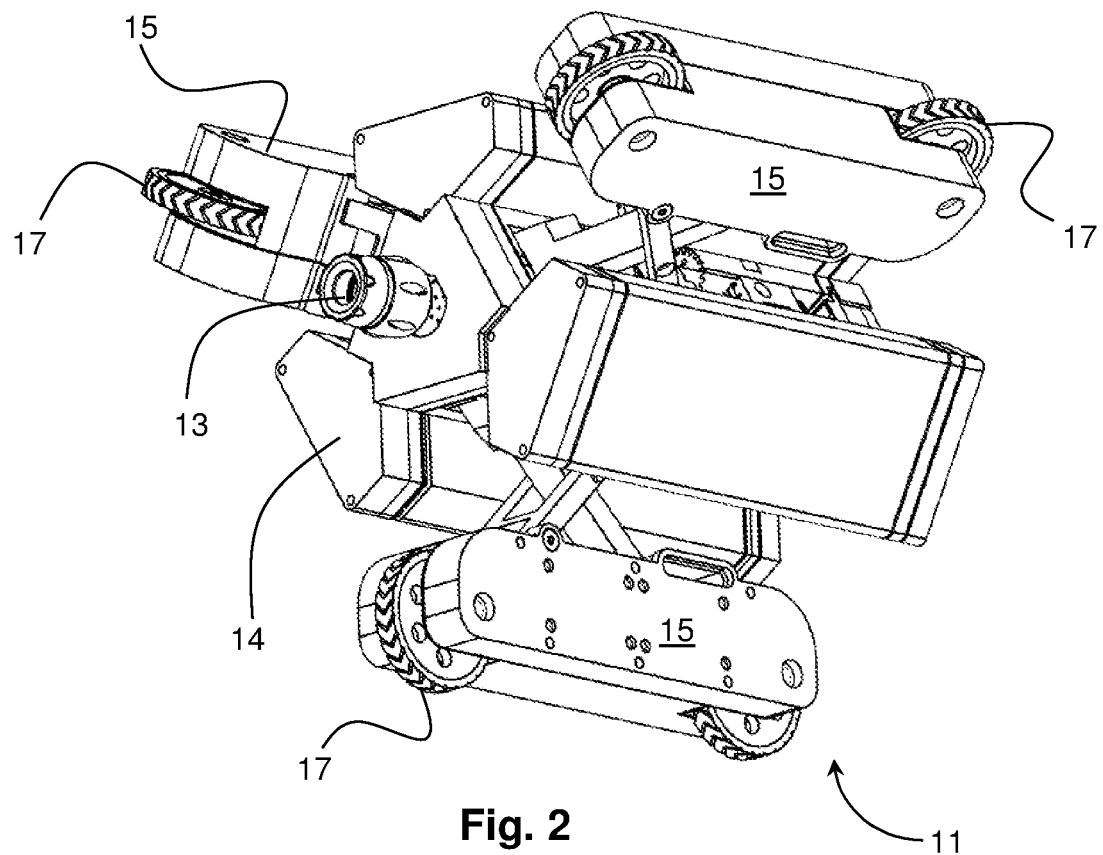
FIG. 2 is a perspective view showing a proximal end of the robot.
Figure 3:
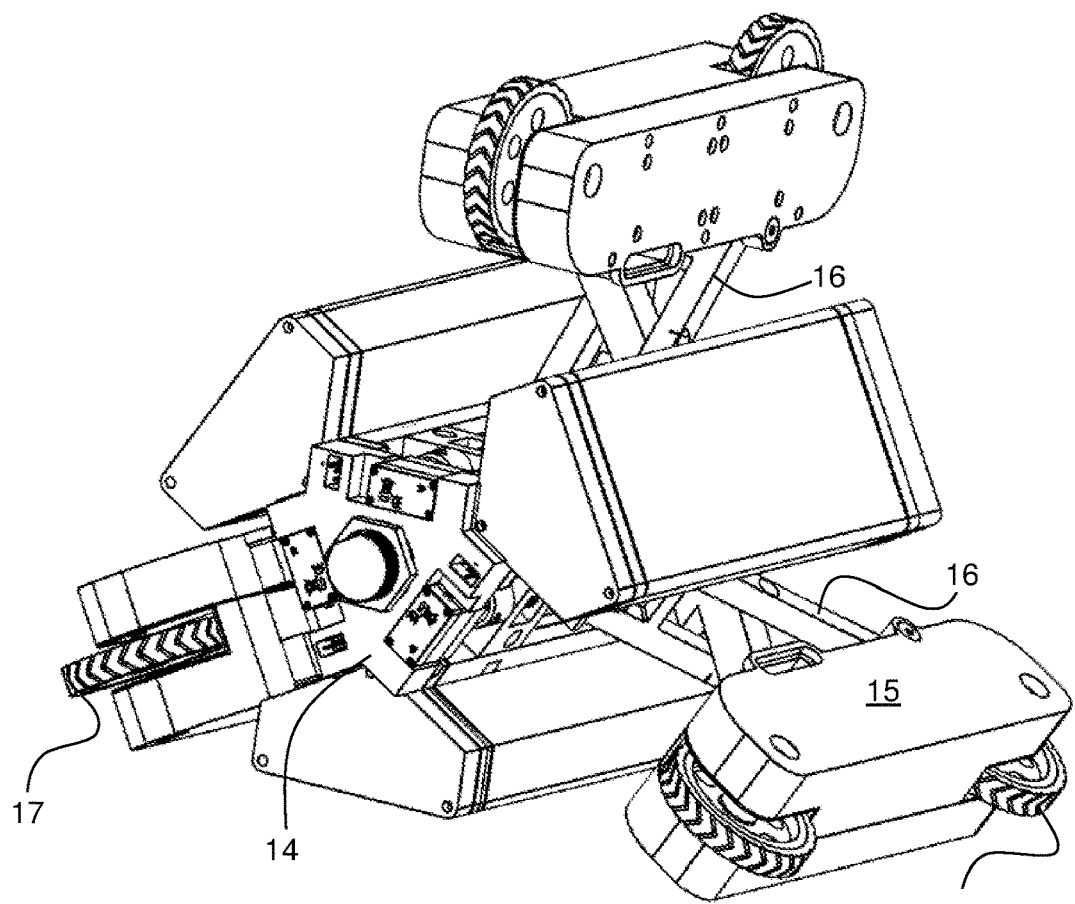
FIG. 3 is a perspective view showing a distal end of the robot.
Figure 4:
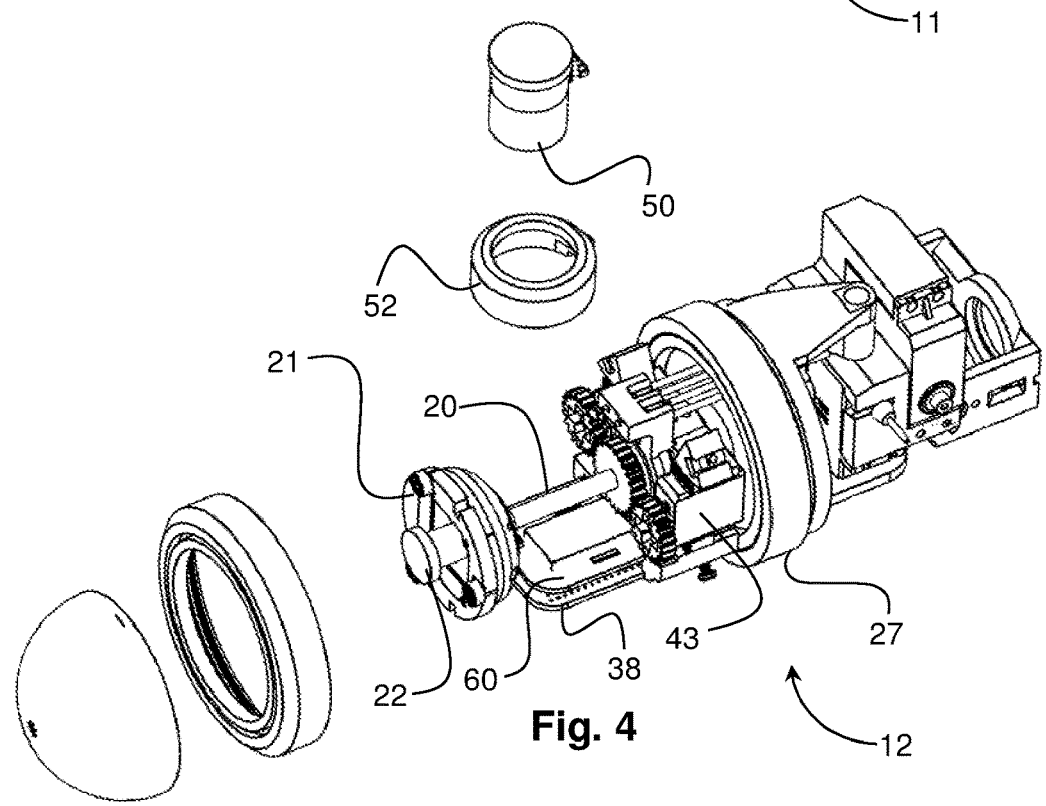
FIG. 4 is a partially cut-away and partially exploded perspective view showing a detail of the sensor head.
Figure 5:
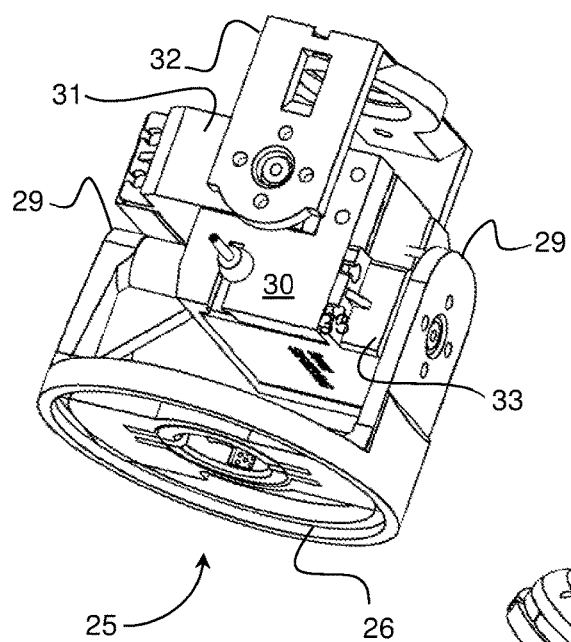
FIG. 5 is a perspective view showing a detail of a pan and tilt mechanism in the sensor head.

FIGS. 1 to 3 show pictorial perspective views of a pipe-inspection system 10 comprising a robot 11 coupled to a sensor head 12. The sensor head 12 may be removably coupled to a proximal (i.e., front) end of the robot 11 by means of a universal coupler 13, which in addition to achieving a sound mechanical connection also conveys power and control signals fed to the robot to the sensor head. These signals may be transmitted to the robot wirelessly although there may be benefits in conveying these signals via a cable (not shown), which serves as a good way to retrieve the robot from inside the pipeline if mobility is impaired for any reason. Such a cable is coupled to a distal (i.e., rear) end of the robot in known manner. The universal coupler 13 feeds electrical power to the sensor head 12 as well as control signals for operating its sensors and for feeding sensor signals corresponding to measured signals to be fed back to the operator, either via the robot cable or wirelessly. The robot 11 has a body portion 14 around which are supported three carriages 15 that are mutually angularly spaced apart by 120° and which may be independently extended and retracted by struts 16. Each carriage 15 supports a pair of wheels 17. During horizontal movement, any two carriages form a wheel base whose respective pairs of wheels 17 engage and ride along an inner surface of a pipe while ensuring that if the robot turns over about a longitudinal axis, it will retain wheel contact with the pipe's inner surface. Alternatively, the struts 16 of all three carriages 15 can be extended in order to create tension of the wheels against the pipe surface. This allows better position control. In inclines, vertical pipes, or in the presence of liquid or gas flow, the wheels get better grip due to the leg tension. In the presence of liquids in the pipe, the upper one or two wheel modules also counteract the robot body buoyancy. These features are known per se, thus rendering unnecessary further details of the mechanical construction of the robot.

The robot 11 may be a custom device that is integral with the sensor head 12, in which case the universal coupler 13 may be omitted. But the invention also contemplates use of the sensor head 12 with off-the-shelf robots of the kind discussed in the Background section.

Figure 6:
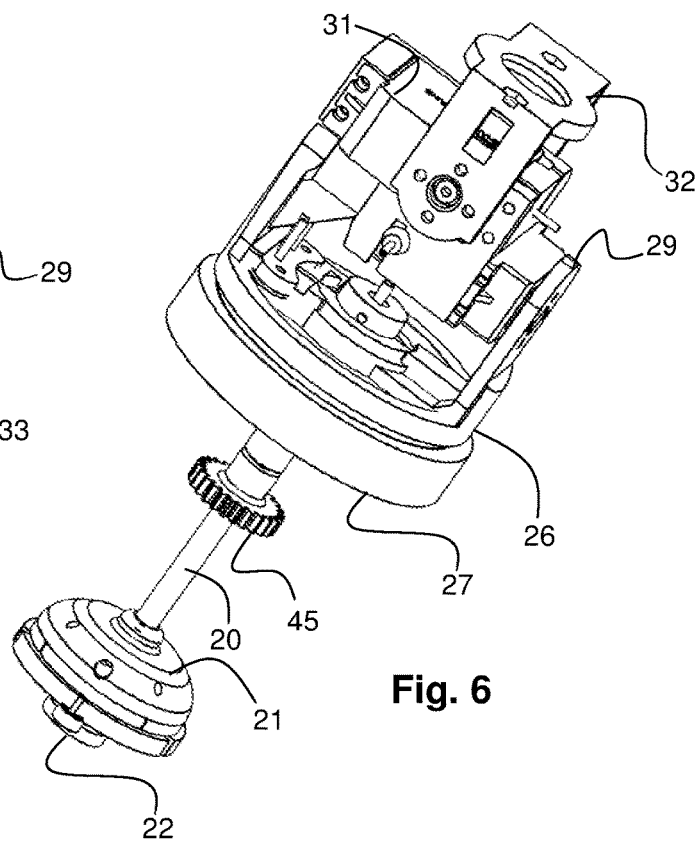
FIG. 6 is a partial perspective view showing a further detail of the sensor head including the center rod and attached components.

Referring to FIGS. 4 to 11, showing details of the sensor head 12 it seen that the sensor head 12 comprising a central rod 20 to a forward end of which is attached a camera support bracket 21 supporting a camera 22 best seen in FIG. 6. The camera 22 has a fisheye lens having an approximate angle of view of 120°. At a rear end of the rod 20 is a pan and tilt mechanism 25 shown in enlarged partial detail in FIGS. 5 and 6. A base 26 of the pan and tilt mechanism is attached to a sealing rotor 27, which is in turn attached to a rotatable barrel 28 that encases the components of the sensor head. The base 26 has a pair of opposing side wings 29 that pivotably support a tilt bracket 30 dimensioned to accommodate a motor 31, rotation of which causes the tilt bracket 30 to rotate about a first axis passing through opposing sockets in the side wings 29. A side bracket 32 is pivotably supported on the tilt bracket 30 so as to be rotatable by a second motor 33 about a second axis mutual perpendicular to both the first axis and the axis of the central rod 20. The side bracket 32 is coupled to the robot as best seen in FIG. 1, such that the motors 31 and 33 allow tilt and pan of the sensor head 12 is a left-right or up-down direction relative to a direction of motion of the robot.

Many known pipe inspection systems use a camera to image the inside of the pipeline. This is not an essential requirement of the present invention, which is based on at least a pair of different signal sources arranged to rotate with the barrel so as to emit signals along a radius of the barrel.

Such an arrangement allows for a very compact design of sensor that can easily be hand-held and combined with, or retrofitted to, an equally compact robot so that the resulting system can be manually placed inside a pipeline. However, the embodiment shown in the figures does include the camera 22, since it is small, adds little cost, and duplicates the functionality of known devices. In the case that the camera 22 is provided, it is preferable to maintain the central rod 20 rotationally fixed in order that the camera 22 cannot rotate, thus avoiding the need to transform the camera image to take into account its rotation. To this end, the barrel 28 and most of the internal components rotate around the central rod 20. Cables (not shown) connect the robot 11 to the sensor head 12 via the universal coupler 13, and clearly these cables cannot be allowed to rotate with the barrel. To this end, the central rod 20 is hollow and cables that feed power and control signals to the camera pass through the hollow core of the rod 20 to the camera 22. Other cables that feed power and control signals to those components in the sensor, which also rotate with the barrel, are connected via slip rings 35 shown in FIG. 8. Thus, the cables from the robot 11 either directly or via the universal coupler 13 are connected to separate concentric conductive rings of a stator 37 that remains stationary relative to the rear end of the sensor head supporting the universal coupler 13.

Figure 9:
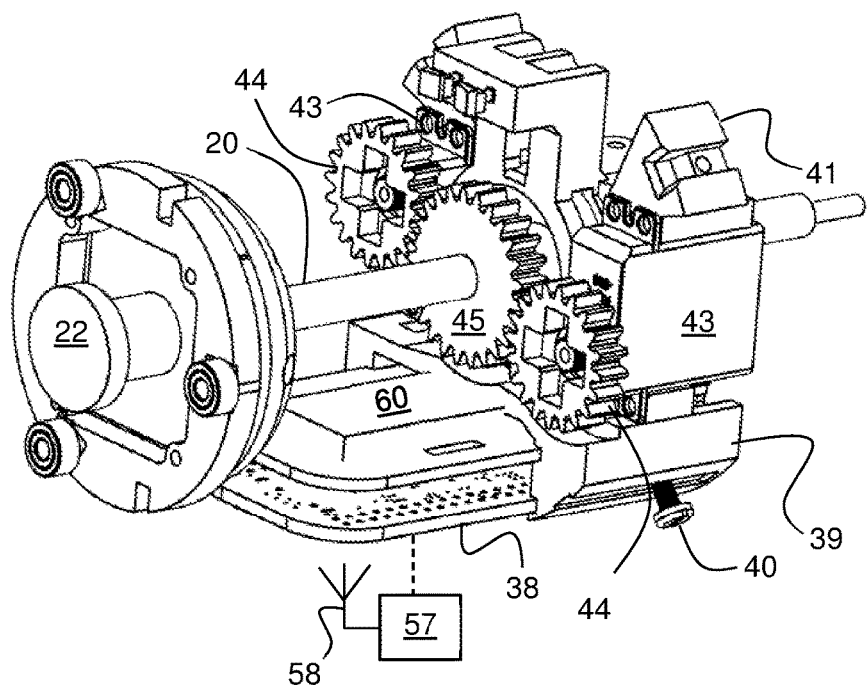
FIGS. 9 and 10 are partial perspective exploded views of the sensor head showing the rotation motors and ultrasonic transducer.

As best seen in FIG. 9, the components inside the sensor head that rotate with the barrel are mounted on a printed circuit board (PCB) 38 mounted on a PCB holder 39 that is fixedly attached to the barrel by screws 40. via support brackets to the barrel. A motor bracket 41 is likewise supported within the barrel either independently of the PCB holder 39 or it may be fixed thereto. Regardless of how it is fixed, it rotates together with the PCB holder 39 and the PCB 38 upon rotation of the barrel. The motor bracket 41 supports on opposing sides respective motors 43 on whose shafts are mounted respective spur gears 44, which mesh with a central spur gear 45 fixedly mounted on the central rod 20. Rotation of the two motors 43 in the same direction causes the motor bracket 41, the PCB holder 39 and all other components supported thereby to rotate with the outer barrel 28 around the central rod 20, which remains rotationally stationary. In a prototype of the sensor head, the central spur gear 45 had 25 teeth while each of the spur gears 44 had 20 teeth, this arrangement providing sufficient velocity ratio to induce rotation of the barrel 28 using two miniature motors. However, it will be understood that the desired effect could be achieved with a single more powerful motor. Wires that feed power and control signals to the PCB 38 are connected to respective concentric conductive rings of a rotor (not shown) having complementary rings to those of the stator and are disposed to make brushing contact therewith. Consequently, the rotor and the components therein are able to rotate while maintaining electrical contact with the stator 37 and the universal coupler 13, thus allowing power and control signals to be conveyed from the robot 11 to the rotating components inside the sensor head 12.

Figure 7:
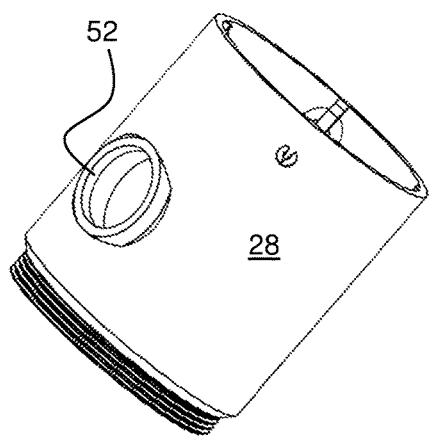
FIG. 7 is a partial perspective view of a rotatable barrel that encases components of the sensor head.
Figure 8:
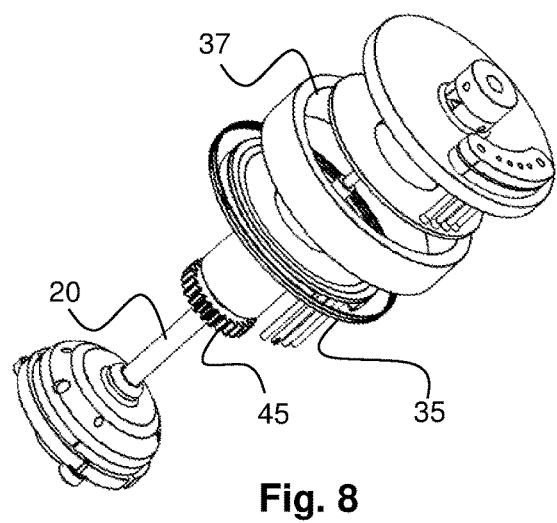
FIG. 8 is a partial perspective exploded view of a rear end of the sensor head showing stator and rotor rings for conveying power and control signals from the robot to rotating components of the sensor.
Figure 10:
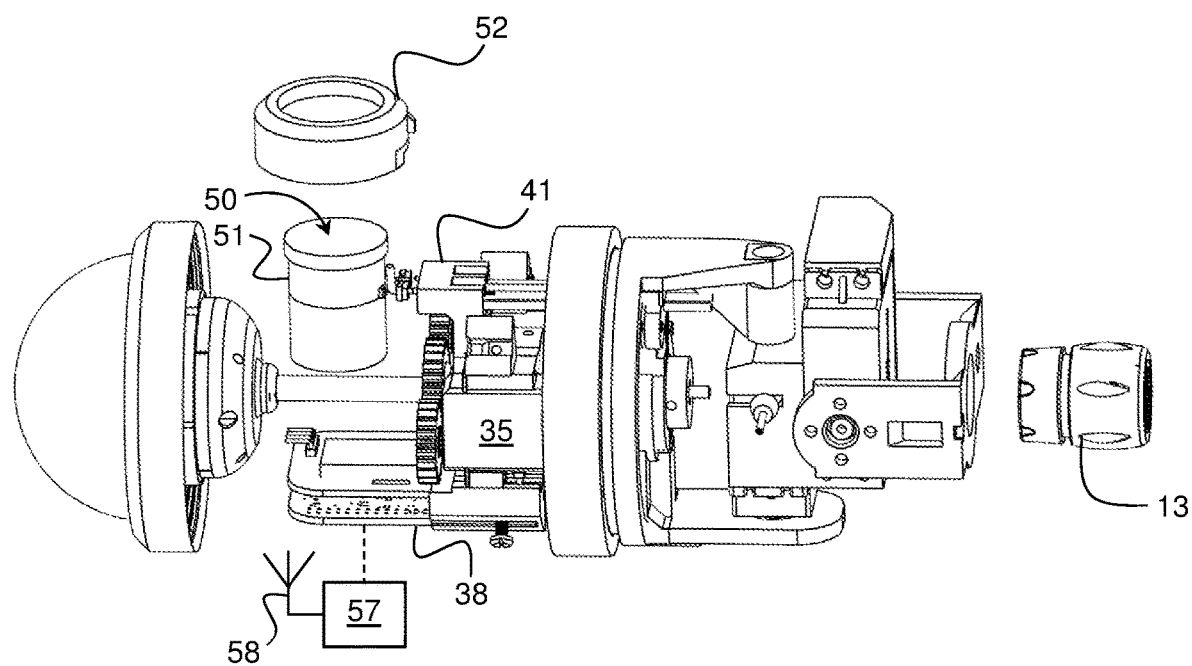

FIG. 10 shows some of the same elements appearing in FIG. 9 albeit from a different perspective, which also shows that the motor bracket 41 supports an ultrasonic transceiver shown generally as 50 comprising a piezoelectric membrane 51 retained inside a holder 52 that extends through a sidewall of the barrel 28 as shown in FIG. 7. The piezoelectric membrane 51 is an acoustic transducer that converts electrical pulses to acoustic pulses, which are then conveyed by the piezoelectric membrane 51 to the surface under inspection. Conversely, acoustic pulses reflected from the surface are converted by the piezoelectric membrane 51 to electrical pulses. For the sake of simplicity, the figure shows the piezoelectric membrane 51 in combination with electronics that together constitute the ultrasonic transceiver 50. In practice, the electronics does not need to be integral with the transducer and may, for example, be mounted on the PCB 38. An impulse radar transceiver 57 shown coupled to the PCB 38 via a dashed line is mounted inside the sensor and rotatable with the barrel 28 and transmits and receives radar pulses via an antenna 58 affixed to an outer wall of the barrel 28. As the barrel rotates, so too do the ultrasonic transceiver 50 and the radar transceiver 57 thus transmitting acoustic and radar pulses to an internal surface of the pipeline through which the robot is directed. A microcontroller 59 mounted inside the sensor and rotatable with the barrel 28 controls both the ultrasonic transceiver 50 and the radar transceiver 57 for emitting and receiving acoustic and radar pulses respectively reflected from the surface of the pipeline, the received signals being conveyed via the PCB 38 and the slip rings to the universal coupler 13 from where the signals may be fed to an external control unit for processing. Alternatively, or additionally, the signals can be stored onboard the sensor head and retrieved after inspection.

Finally, so far as the internal components of the sensor head are concerned, there are a power controller 59 having an embedded inertial measurement unit (IMU) as well as a microcontroller 60 (mounted on the PCB 38) both configured for rotation with the barrel 28. The IMU is an example of positioning sensor that uses gyroscopes and accelerometers and optionally magnetometers for determining the sensor head orientation. Additional or alternative positioning sensors may include encoders.

The positioning sensors can be used for closed loop control of the rotation speed. They can also be logged together with the pipe measurement signals for mapping the data for processing after completing the measurement run. In some embodiments, the microcontroller 60 is programmed to rotate the motors 43 at a speed that varies in accordance with the advance speed of the robot 11 (and hence the sensor head 12) in order to ensure that the ultrasonic and radar pulses scan the complete inner circumference of the pipeline as the robot progresses linearly along the pipeline. This ensures that the robot 11 advances with maximum speed commensurate with the rotation speed of the sensors. The required advance speed is determined based on the pipe diameter, the sensor coverage area, and the rotation speed. Without this feature, the advance speed would have to be set low enough to ensure sufficient measurement coverage. Another example is adjustment the sensor head centering. Proper centering is determined based on the variation in sensor distance to the pipe measured through a rotation. Alternatively, the advance speed of the robot may be reduced below the optimal speed, such that the rotating sensors cover successive helical slices that slightly overlap. This, of course, gives rise to some signal redundancy, but this can be compensated for by post-processing.

The ultrasonic and radar sensors only measure over a limited area of the pipe at any instant for an instantaneous position of the ultrasound transceiver 50, but the head rotation allows it to piecewise cover the whole inner circumference of the pipe as shown for successive passes. Similarly, integral coverage in the pipe length direction is achieved by advancing the sensor head. The ratio between the rotation and advance rate must be such as to allows sufficient measurement coverage and overlap circumferentially and longitudinally. The resulting measurement path is a spiral.

The pan and tilt motors 33, 31 can be controlled in open loop, in closed loop with the positioning sensors, or in more advanced closed loops employing the pipe measurement signals to determine the optimal wave angle of incidence. Miscellaneous additional pipe measurement sensors can be added to complement the system. These include, but are not limited to, cameras, temperature sensors, or laser measurement systems.

The universal coupler 13 between the sensor head 12 and the robot 11 can also include other interfaces such as communication and power and is designed to allow the sensor head 12 to be retrofitted to off-the-shelf robots either directly or via a suitable adapter. Alternatively, separate interfaces may be provided for power, control and communication.

The robot 11 may provide telemetry data, including, but not limited to, advance speed, and position in the pipe and may have actuators for adjustment of the sensor head centering in the pipe.

The microcontroller 60 may be responsive to the deviation for adjusting the pan and tilt motors 31 and 33 for re-centering the sensor head in a closed-loop system until no deviation is measured. Similarly, if the robot moves into a section of pipe of different diameter, coarse centering can be achieved by varying the angle of elevation and optionally length of an adjustable arm (not shown) connecting the sensor head to the robot while fine adjustment can be achieved using the pan and tilt mechanism.

The microcontroller 60 may be responsive to the deviation for adjusting the pan and tilt motors 31 and 33 with a known off-center to generate a predictable sinusoidal deviation pattern from the pipe surface. Since this pattern will be easily predictable for a known off-center and pipe diameter, it will help distinguish between static elements (clutter) and the pipe reflections.

Figure 11:
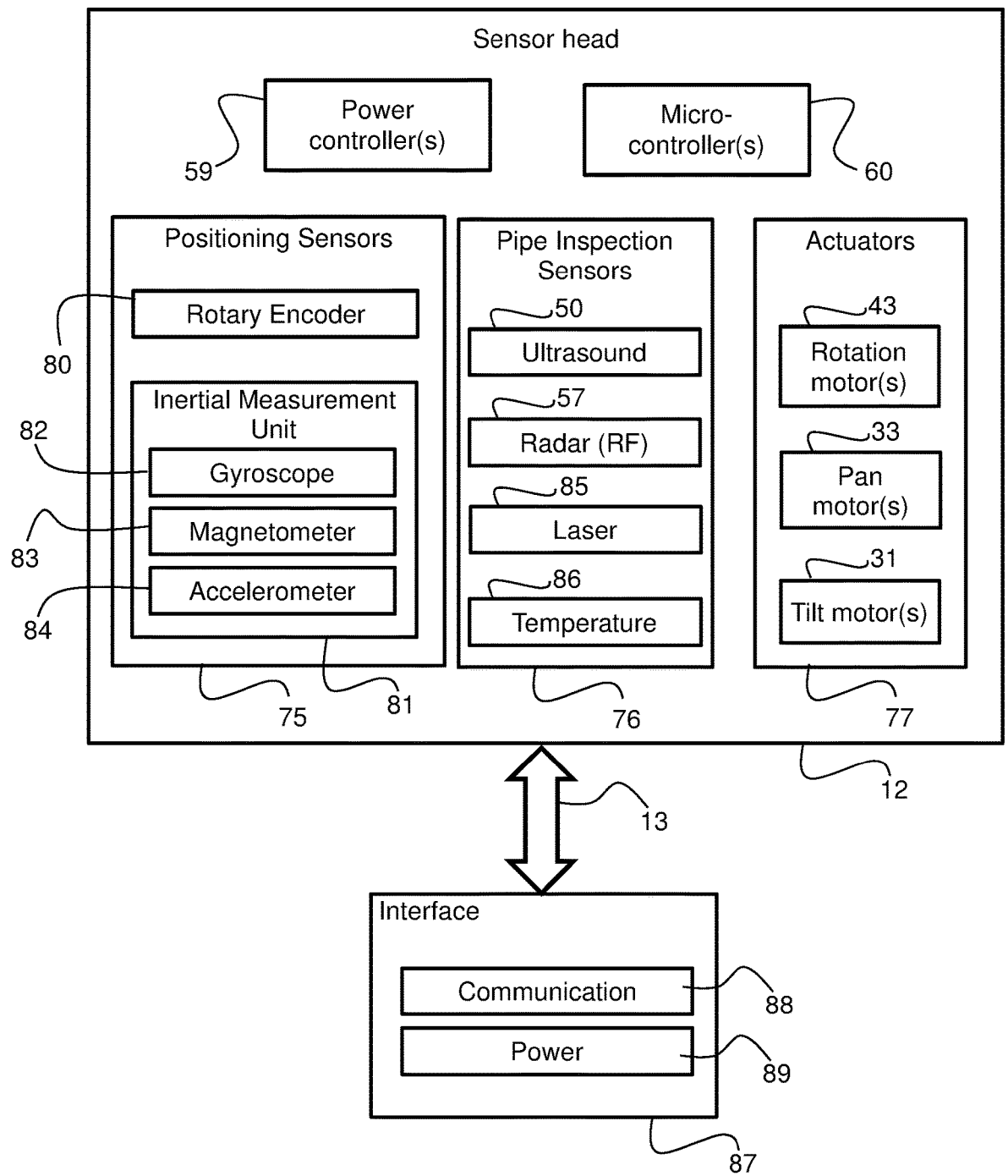
FIG. 11 is a block diagram showing components of the sensor head.

FIG. 11 is a block diagram showing functionality of the sensor head. Some of these elements have already been described and will be referenced by the same reference numerals. The components inside the sensor head include one or more power controllers 59 and microcontrollers 60 which are responsive to or control positioning sensors 75, pipe inspection sensors 76 and actuators 77. The positioning sensors 75 may include a rotary encoder 80 and an IMU 81 comprising a gyroscope 82, a magnetometer 83 and an accelerometer 84. The pipe inspection sensors 76 include the ultrasound transceiver 50 and the RF transceiver 57. They may also include a laser 85 and a temperature sensor 86. Other sensors of interest, albeit not shown in the figure, include microphone since leaks tend to cause sound, chemical sensor to detect gasses, and thermal camera. The actuators 77 include the rotation motors 43 and the pan and tilt motors 33 and 31, respectively. The laser 85, if included, provides an alternative approach to inspecting the integrity of the pipeline. The temperature sensor 86 may be used to detect a rise in temperature along a region of the pipeline commensurate with ingress of wastewater, which is typically hotter than the main water supply and thus indicative of a leak or other failure in the pipeline, or vice versa, a temperature-decrease in the event of a water pipe leaking into a wastewater line.

FIG. 11 also shows schematically the universal coupler 13 having or being coupled to an interface 87 in the robot for supplying communication 88 and power 89 to the sensor head. The communication interface 88 is bi-directional allowing control signals to be fed from the robot to the sensor and allowing for control and data to be fed back to the robot. For example, if the sensor head detects that it has moved from a region of small diameter to a region of larger diameter thus requiring adjustment of the arm 62, the resulting control signal is fed back to the robot since the necessary adjustment must be applied on-board the robot. The power interface 89 feeds DC voltage to the sensor head. This can be via a battery in the robot or via a wire (not shown) or possibly both.

Signal Processing

As noted above, the microcontroller 60 may be programmed to perform on-board processing of the measured data. For the sake of abundant caution, it will be appreciated that any of the microcontrollers may be so programmed and although we describe three separate microcontrollers each responsible for different functions, these functions could be controlled by the same microcontroller. It will also be understood that each microcontroller includes a processor and memory and additional memory may be mounted on the PCB 38 to store data. In either case, stored data can be processed on-board or can be relayed either wirelessly or by a wire (not shown) to a remote computer for processing.

Figure 12A:
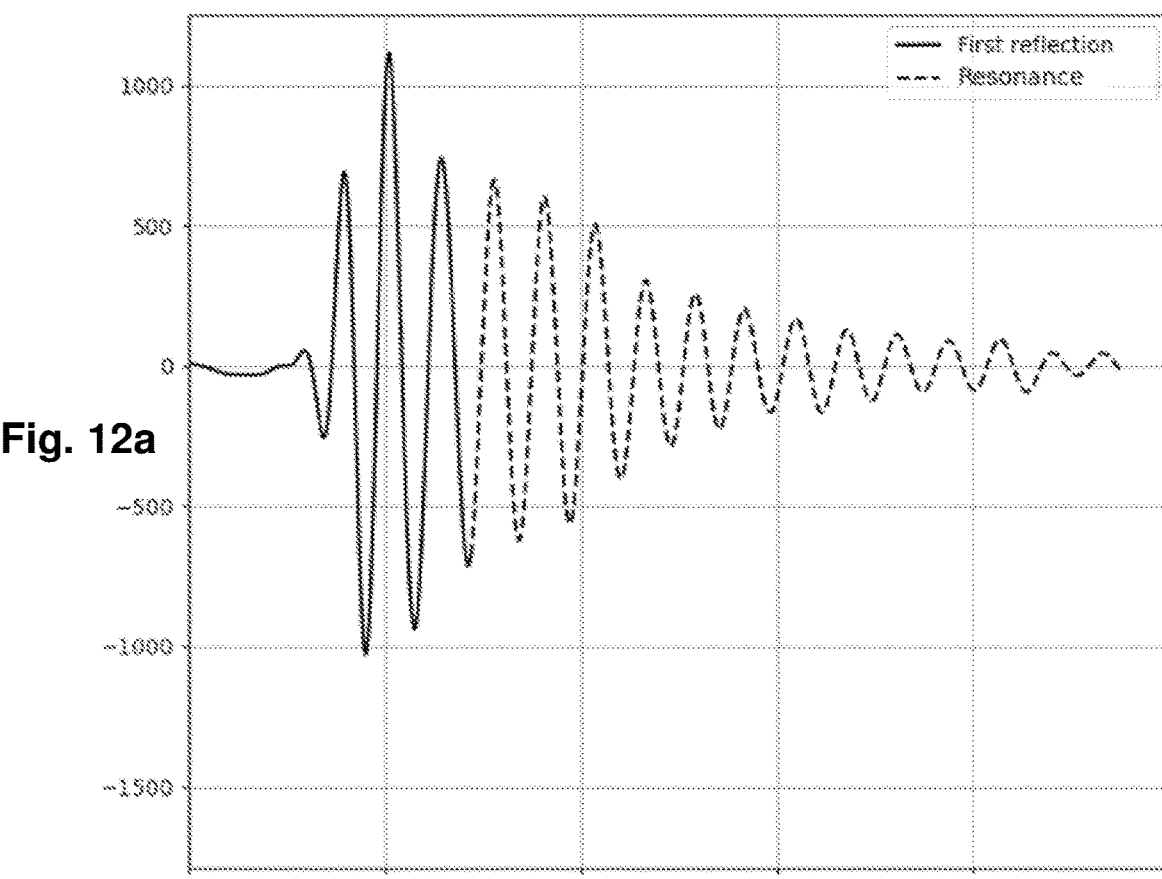
FIGS. 12a and 12b show graphically signal response waveforms for detecting defects in the pipe wall.
Figure 12B:
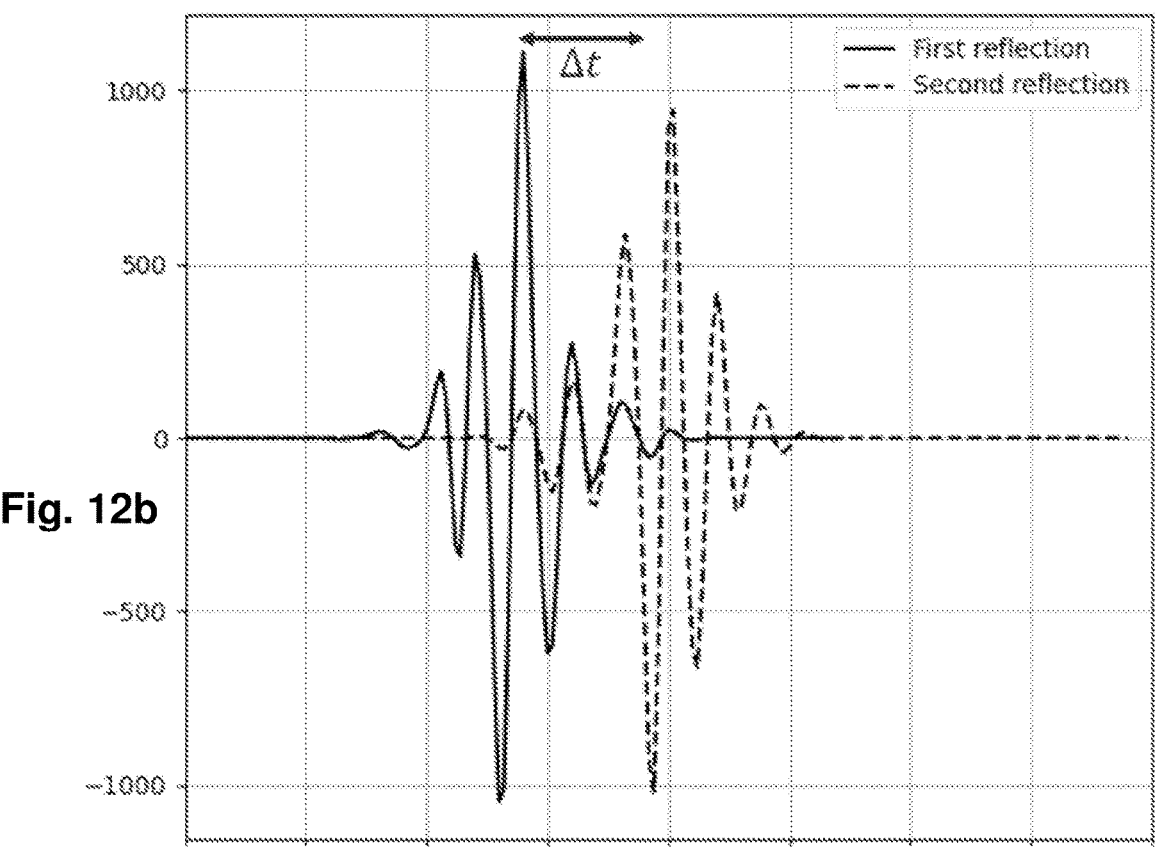

FIGS. 12a and 12b show graphically signal response waveforms for detecting defects in the pipe wall. Although these waveforms were derived for ultrasound pulses, an important feature of the invention is that the general form of the signal response is the same for both ultrasound and radar. Both the radar and ultrasonic sensors emit wide-band pulses with relative bandwidths that are similar for both modalities. This enables many of the signal processing techniques to be used interchangeably by the two sensor modalities. The physics governing the propagation of radio waves and acoustic waves are however different in terms of velocity and scattering properties, which makes them suitable for different tasks, but at the same time highly complementary to each other.

Radio waves propagate poorly through conductive materials and are therefore best used only for inspecting the inside in case of conductive pipes. Non-conductive pipes will allow radio waves to propagate through them and scatter off the pipe surface and its immediate surroundings. Although the relative bandwidths are similar for the two modalities, i.e., the shape of the sampled pulse seen in FIG. 12b, the much lower propagation velocity of ultrasonic waves results in shorter pulses that are more suitable for measuring the interior of the pipe wall.

Both the ultrasonic transducer and the impulse radar antenna emit and receive waves in the form of short pulses and measure the time taken for these waves to travel a distance through a medium. If the velocity is known, this information can be used to measure the distance through the medium using the formula $$d = \frac{vt}{2}$$

where d is the distance, v is the velocity, and t is the measured time. The fraction ½ indicates the pulse has traveled through the medium and back. If the distance is known, velocity can similarly be derived from time and distance. The wave velocity depends on the medium through which the waves pass and is a fundamental property of the material, although the properties that are most responsive to radar and ultrasound are different as shown in Table I below.

TABLE I

Comparison of material properties
sensitive to radar and ultrasound

| Material properties affecting: | Radar | Ultrasonic |
|---|---|---|
| propagation | Permittivity and Permeability | Density and Pressure |
| dampening | Conductivity | Viscosity |

Electromagnetic and acoustic wave propagation is generally affected by fundamental properties of the material in the following way. Ultrasonic propagation is mainly affected by the complex relationship between the density and pressure of the medium. Radar propagation is mainly affected by the permittivity and permeability of the medium.

The propagation velocity of ultrasonic waves through any given medium can be expressed in terms of its material properties through the formulas:

$$v^{ul} = \sqrt{\frac{K}{\rho}}$$

where K is the elastic bulk modulus, a product of pressure, and $\rho$ is the density. For the velocity of electromagnetic waves through a medium, $$v^{radar} = \frac{c}{\sqrt{(\epsilon_r * \mu_r)}}$$

where c is the speed of light, $\epsilon_r$ is the material's relative permittivity and $\mu_r$ its relative permeability.

The receiver samples the incoming wave fast enough to preserve the frequency information within the passband of the pulse, and for a duration long enough to capture multiple pulses reflected off the wall surface at different distances. Reflections are caused by changes in the material's characteristic impedance, which are derived from material properties, and can be used to measure the distance to the interface where the wave enters a new material. An impedance change in terms of radar waves is determined by the permittivity and permeability of the medium. Similarly, the impedance changes affecting the ultrasonic pulse propagating through the medium are a function of the pressure and density. Further the ability of the medium to attenuate the signal can be characterized by its conductivity and viscosity for impulse radar and pulsed ultrasound, respectively.

Pulse echo measurements can be used to measure the thickness of an object such as a pipe wall. An ultrasonic or radar pulse is transmitted with normal incidence at the pipe wall. Based on this setup, two scenarios arise depending on the thickness and propagation velocity of the wave through the pipe in relationship with the center frequency of the transmitted pulse. In one scenario, the thickness of the pipe ($d_p$) is around one-half wavelength $\lambda_p$ of the transmitted pulse i.e., $$\lambda_p = \frac{v_p}{f_c} \approx 2d_p$$

where, $v_p$ is the compressional velocity of the pipe material, and
$f_c$ is the center frequency of the transmitted pulse.

This excites resonance in the pipe wall giving rise to the response waveform as seen in FIG. 12a, where the first large pulse is the reflection from the pipe wall and the dashed part is the resonance. The first reflection is used to detect cracks/irregularities on the inside and the geometry of the inside of the pipe, while the resonance is used to calculate the pipe thickness, fractures, and the surrounding material on the rear side.

The second scenario is where $d_p > 2\lambda_p$, where the pipe wall is either quite thick, or has a very low velocity or both. When this is true, there will be a separation between the first reflected pulse from the inside of the pipe and the second reflected pulse from the rear side of the pipe. This is seen in FIG. 12b, where the solid line is the first reflection while the dashed line is the second reflection. The time difference ($\Delta t$) between the two pulses is calculated and provides an estimate of the pipe thickness. In addition, similar to the first scenario, the first reflection is used to measure cracks/irregularities on the inside and the geometry of the inside of the pipe. The relationship between the amplitude of the first and second reflection is used to estimate the surrounding material on the rear side.

Actual algorithms are dependent on some pipe properties as found in datasheets or estimated in lab testing. Determination of pipe defects using ultrasound pulse echo measurements is known per se and is described in:

[1] Sirevaag, T. PhD thesis (2019) Norwegian University of Science and Technology (NTNU);
[2] U.S. Pat. No. 11,221,314 "Combined pulse echo inspection of pipeline systems", assigned to Baker Hughes Oilfield Operations
[3] U.S. Pat. No. 11,143,016 "Method for Evaluating a Material on a Remote Side of a Partition using Ultrasonic Measurements" assigned to Equanostic AS While ultrasound propagates best at a solid/liquid interface, RF propagation in air-filled and porous sediments makes impulse radar especially suitable for such environments. The longer wavelength of radio waves, compared to ultrasound, will propagate further past the pipe outer wall, and will be used to inspect the pipe immediate surroundings using techniques known as ground penetrating radar. By combining accurate IMU location estimates of the sensor head and pulse measurements, techniques such as synthetic aperture radar or synthetic aperture ultrasound can be applied.

When using time of flight in order to measure depth or distance, we have to provide an estimate on the velocity of the pulse. For a radar device this means having a fairly accurate estimate of the material's permittivity. For an ultrasonic sensor, the velocity will similarly rely on accurately estimating the density and pressure.

For some materials, the velocity will be easier to estimate accurately for electromagnetic pulses propagating through a medium, whilst for other materials it might be easier to estimate the velocity of acoustic waves. This is especially true in non-homogeneous materials where the different components comprising the material might have larger internal variances in terms of medium velocity for one of the two modalities. Concrete will for example be more homogeneous in terms of velocity for electromagnetic waves than for acoustic waves. In the case of concrete, it might therefore be beneficial to first estimate the electromagnetic velocity and derive the acoustic velocity from the time-of-flight.

Figure 13:
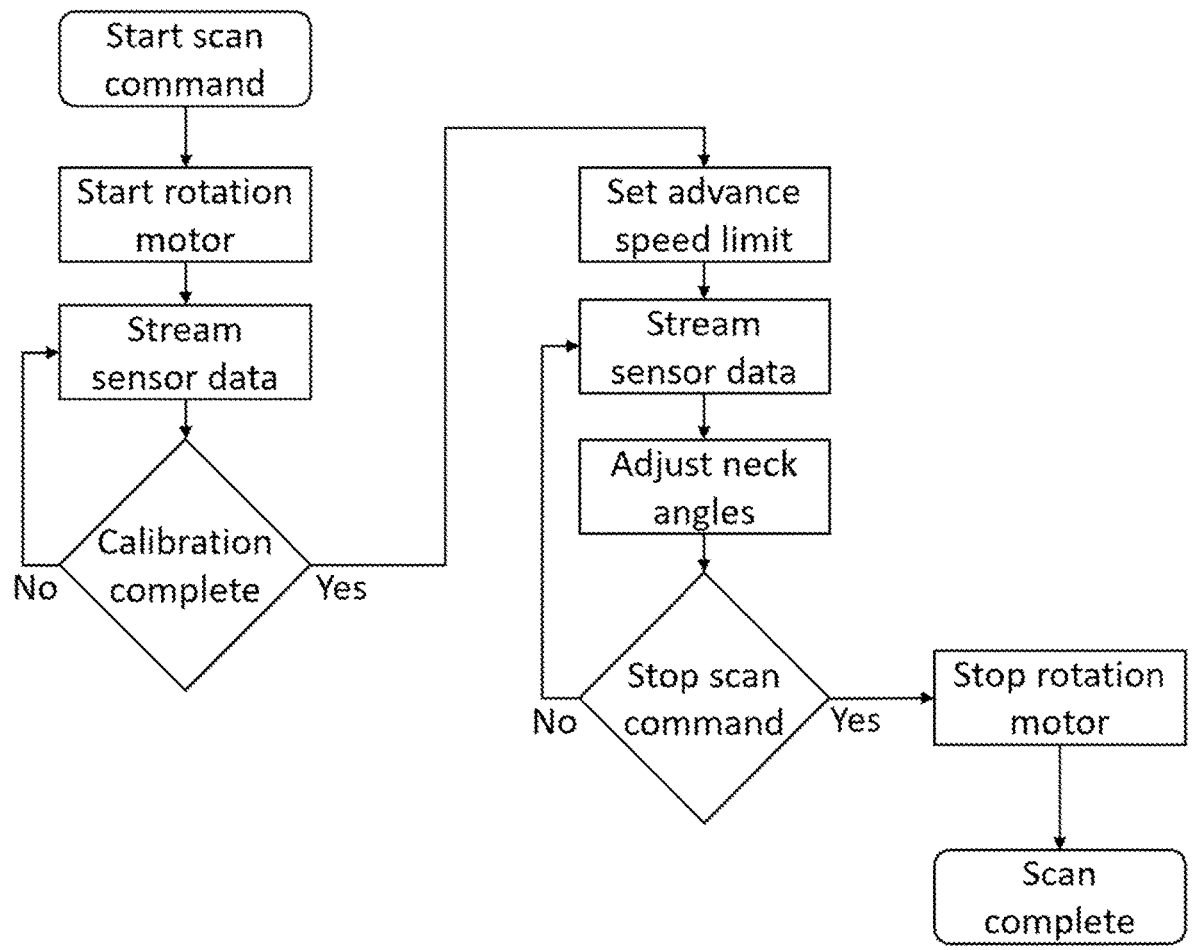
FIG. 13 is a flow chart showing the principal operations carried out during use of the sensor head to scan a pipe wall.

FIG. 13 is a flow chart showing the principal operations carried out during use of the sensor head to scan a pipe wall. An initial scan is performed after inserting the pipe inspection system 10 into a pipeline by actuating the motor 43 in order to rotate the barrel 28 and actuate the ultrasound transducer and the impulse radar transceiver. The resultant signals are reflected from the internal wall surface of the pipeline and processed, as described above, to obtain initial results. During this procedure, the initial or rest position of the sensor head may be adjusted if necessary, so that it is centrally disposed within the pipeline and the signal propagation time is constant for all signals during a complete 360° rotation of the sensor head. Once this is achieved, calibration is complete and we then set the advance speed limit for the robot and propel the robot and attached sensor head through the pipeline, while rotating the barrel 28 and storing the reflected signals for processing, either on-board the sensor head or externally, as required. During this, the neck angles of the sensor head may be adjusted if necessary, so that the central rod 20 of the sensor head is centrally disposed within the pipeline. This continues until a 'stop scan' command is entered, which deactivates the motor 43.

The apparatus is controlled through a graphical user interface (GUI). This can be run on a computer or other device. Its two main functionalities are to let the operator direct commands to the apparatus, and to give the operator feedback from the apparatus. The most common and basic operation is facilitated by command buttons corresponding to operations such as "Calibrate robot in pipe", "Start dry measurement", "Stop", "Start wet return measurement", "Stop". The operator can independently control such settings as advance speed, rotation speed, or camera angle. To ensure proper data collection, other settings may be automatically adjusted. For instance, manually reducing the rotation speed should automatically reduce the advance speed as described above. The interface can provide raw feedback telemetry data such as measured speed, camera frames, or similar. Real-time results from the online processing can also be included in the GUI.

Some processing can be done online, providing the operator with real-time data as the apparatus progresses through the pipe. Additional results are available through postprocessing. Reasons for postprocessing may include algorithms too computationally heavy for real-time processing, or that they require comprehensive analysis of the data.

Proper positioning is essential to superpose data from different passes of the pipe. Position and orientation can be determined based on sensor data, e.g. from encoders, IMUs and similar. These measurements can be used together with estimation algorithms, such as, but not limited to the Kalman filter.

Improved positioning precision can be achieved by combining data from complementary sensors, additional precision or insight can be gained. For example, camera frames can be used together with IMUs. Another example is combining a priori knowledge of distance between pipe junctions with the measured location of such junctions.

Combined, the processed pipe measurement and positioning data allow the operator to precisely determine the nature and location of pipe defects. Thus, the required need for intervention can be decided.

The results of the inspection can be presented through a graphical user interface. This can be run on a computer or other device. The program can allow the user to explore different detail levels of the data, including, but not limited to a score describing the condition of each pipe segment, wall thickness at given points of the pipe, and such. The GUI allows selection of specific pipe segments, rendering of camera frames and report generation based on the inspection results.

The invention differs from known combinations of acoustic and electromagnetic sensing platforms in several ways that are essential to a "joint interpretation" of the structures being examined. Interpretation of an ultrasonic sensor and a radar sensor individually will often lead to ambiguity, and certain properties of the material being evaluated can then only be identified when combining and interpreting the measurements jointly. An example of this is that high water content in materials such as concrete or wood will result in a strong dampening of electromagnetic waves, compared to a dry material, and increase the time it takes the pulse to propagate to a reflector and back. If water content is underestimated because the exact permittivity of the medium is unknown, the reflector will be interpreted as being farther away from the sensor than it actually is. Ultrasonic waves however will propagate faster and experience less attenuation when the water content is increased. This coherent but opposite effect can be exploited by combining these sensors for joint processing and interpretation. This leads to a sensor system with double the number of physical parameters that can be utilized to distinguish different materials that can be modeled by a single generalized equation.

Owing to such indeterminacies, measurements taken by any one sensor on its own are liable to be unreliable. But regardless of the wave propagation through the material, the time taken for the pulse to travel from the sensor and back can be measured accurately. As we show below, this allows the measured times from two different sensor types to be used to compute velocity and range. In effect, even in cases where both range and velocity for each signal on its own are indeterminate, the use of two different sensors to measure respective pulse propagations times to at least two common locations, creates a pair of simultaneous equations having two unknown variables. Such a pair of equations is solvable for both range and velocity. The specific combination of ultrasonic and radar sensors as described thus acts as a hybrid sensor rather than simply a multi-sensor system wherein the measurements provided by the ultrasonic and radar components individually may be regarded as modalities of the hybrid sensor.

The combination of short pulse ultrasonic and impulse radar sensors is especially suitable for hybrid sensing because:

Propagation can be modeled by a single generalized equation, thereby simplifying the physical interpretation of the data. For example, the elastic wave equation caters for both longitudinal and transverse motion. When the force and displacement quantities are set to zero it effectively becomes Maxwell's equation for the propagation of the electric field.

Both sensor modalities directly sample the impulse response of the propagation path through the medium under observation. This ensures that a similar response will be produced and measured by both modalities. A response measured by any one modality will thus have a corresponding response in the second measurement, where effectively all interfaces between two materials can be jointly evaluated with little to no further processing.

Precise measurement location mapping is performed on the same device for both sensor modalities, ensuring that a sequence of timed measurements from the two can be compared on a measurement-to-measurement basis. A shared coordinate system and movement vector is especially important for real-time processing applications and eliminates the need for data alignment of results that would most often be required when the measurements are gathered and processed separately.

By combining these two sensors such that the impulses are comparable in relative bandwidth and window of observation, the measured data can be combined in such a way that behaves like a new sensor system, affected by twice the number of physical parameters that can be utilized to distinguish different materials. Unlike conventional system that employ multiple sensors, the hybrid sensor according to the invention utilizes different sensor types that can be modeled by a single generalized equation. Likewise, the measured data can also to a large degree be processed by the same processing techniques and algorithms, either individually or jointly. In order to demonstrate how this is achieved in practice, we will now describe different techniques, which exploit the synergy between the ultrasound and radar sensors.

Figure 14A:
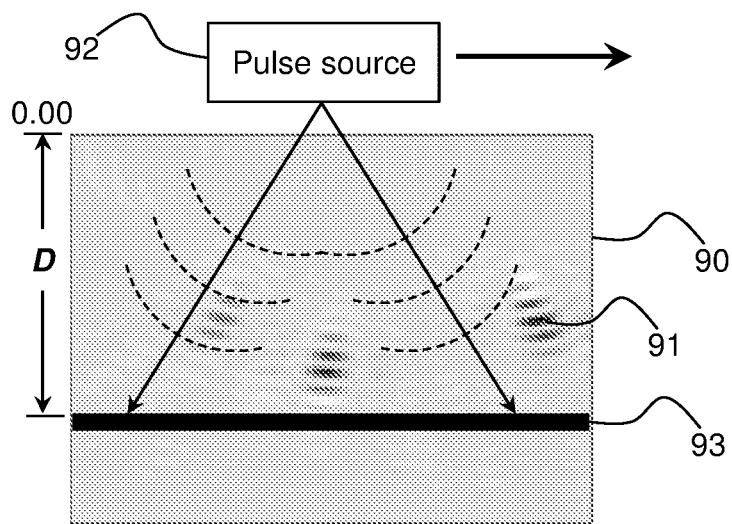
FIG. 14a is a schematic representation of a section through a concrete structure in which synthetic aperture techniques are used to detect and analyze artefacts.

One example of this is the synthetic aperture radar (SAR), or synthetic aperture sonic (SAS) image derived as shown schematically in FIG. 14a. SAR is a type of radar that uses the motion of the radar antenna over a target region to provide finer spatial resolution than conventional stationary beam-scanning radars. In FIG. 14a there is shown in cross-section a block of concrete 90 in which there are disposed various artefacts 91 at varying depths from the upper surface of the concrete block denoted by a depth equal to zero. Pulse sources 92 such as ultrasound or radar or a combination of both are used to directed pulses through the concrete block while at the same time moving along a length of the concrete block in the direction of the arrow. The pulses are reflected by the remote internal surface of the concrete or any intervening artefacts encountered by the pulses, in an analogous manner than radar is used to locate objects in space. In the absence of any such artefacts, the pulses would be reflected by the remote internal surface shown as 93 in the figure, thus allowing the depth D to be determined, However, pulses reflected off intervening artefacts 91 give rise to constructive and destructive interference, thereby producing echo response images of the kind shown in FIG. 14b.

SAR is used to create two-dimensional images or three-dimensional reconstructions of objects, such as the pipeline. SAR requires relative motion in the measurement scenario, either the radar or the target should be moving. To create a SAR image, successive pulses of radio waves are transmitted to "illuminate" a target scene, and the echo of each pulse is received and recorded. SAR exploits antenna motion to create a virtual aperture that is larger than the physical antenna, and is used to create high-resolution images of the inspection site. The synthetic aperture (SA) algorithm used to generate the pictures is implemented as a single software module. The input to the SA algorithm is a time-series of sampled pulses from either an ultrasonic analog-to-digital converter (ADC) or a radar ADC. In addition, if the SA algorithm is provided with either data with a normalized sampling frequency and propagation velocity, or the specific sampling frequency of the sensor and material properties, the SA algorithm will not need to distinguish between radar or ultrasonic data. FIGS. 13a and 13b shows an illustration of this where input from a radar sensor and an ultrasonic sensor are both used as input to a generic digital signal processing (DSP) module, as described in more detail below with reference to FIG. 17. Here velocity and attenuation can be derived from the material properties listed in a predefined table and provided to the algorithm directly, as illustrated by the "context select" block, or the listed properties can be used as input and derived by the DSP.

Figure 14B:
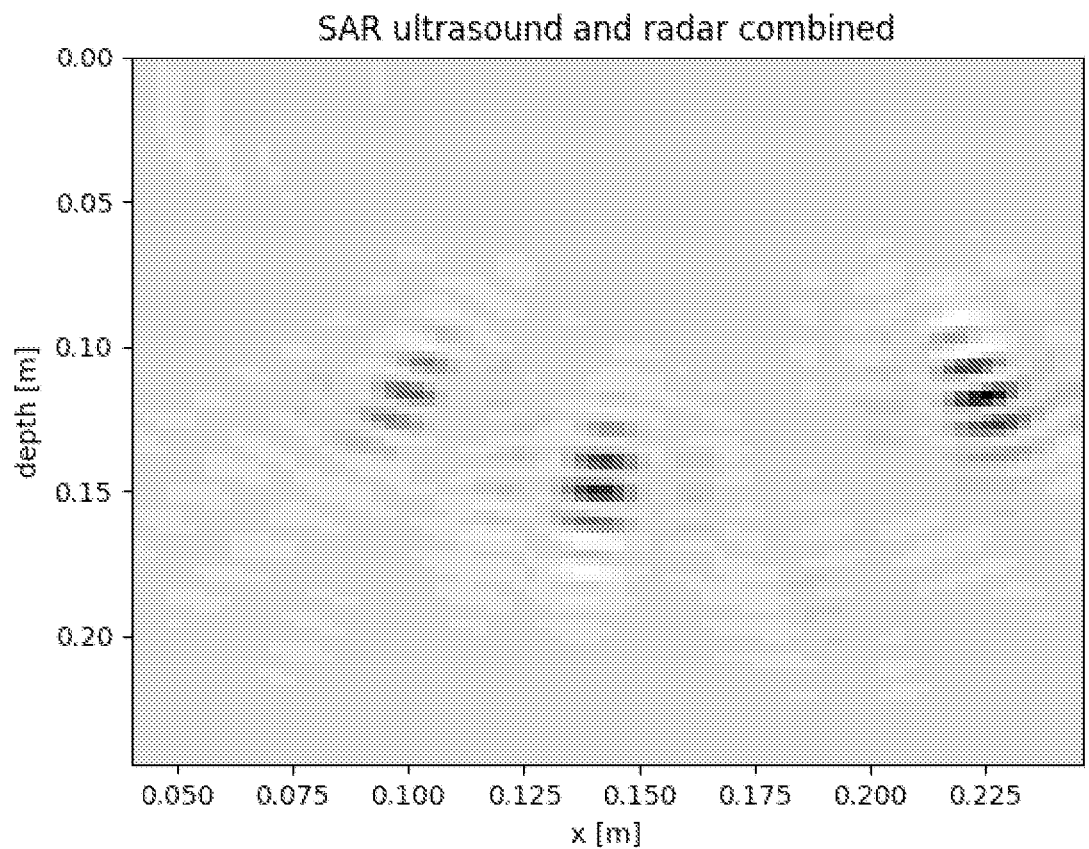
Figure 15A:
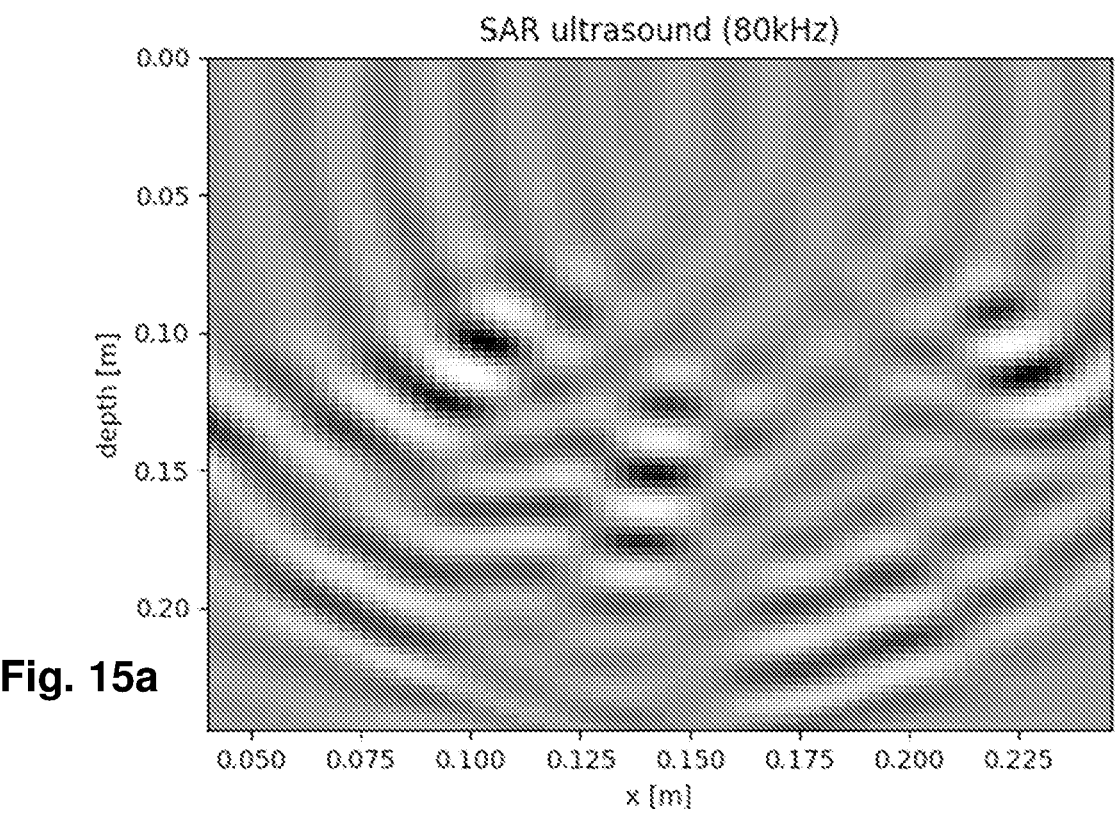
FIGS. 15a and 15b are images showing synthetic aperture responses from radar and ultrasound sensors, respectively.
Figure 15B:
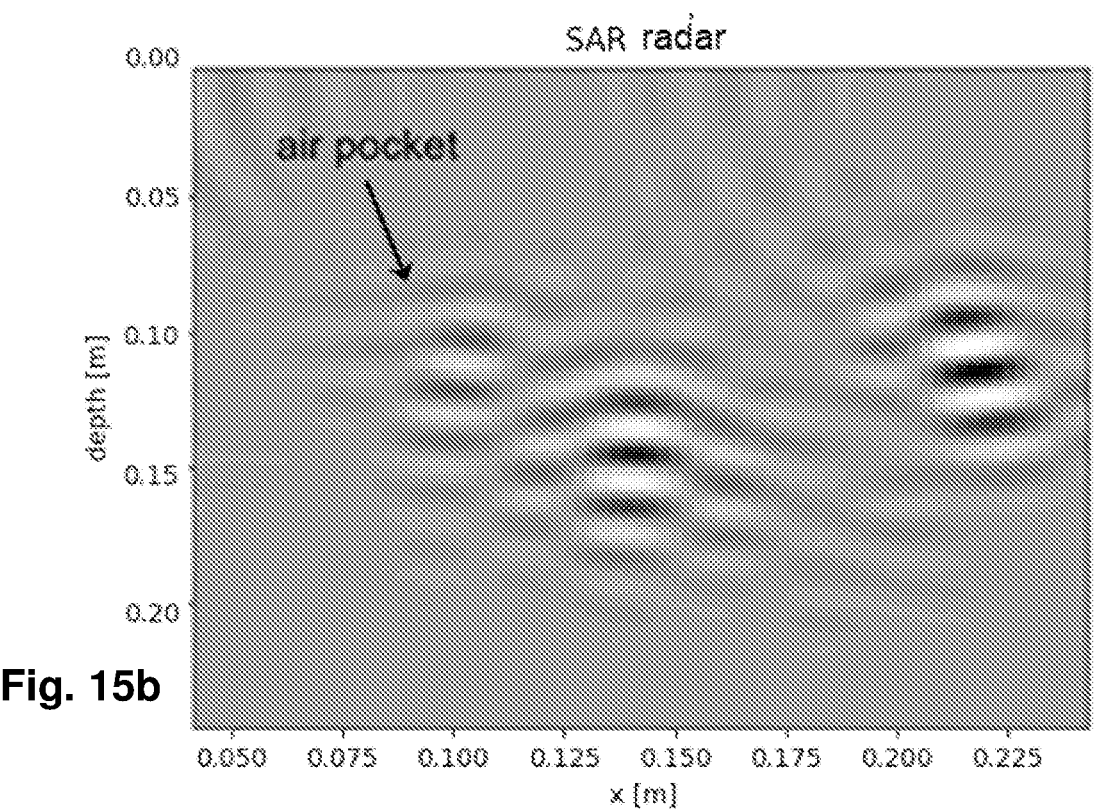

As previously mentioned, certain properties of the material surrounding the hybrid sensor favor one of the modalities over the other, and to some degree lead to the result largely relying on one modality. This is where the current invention excels: it will still produce the same expected results. As an example, let us consider that the environment undergoing inspection comprises three dissimilar materials. These materials have a high, similar, and low attenuation for the two modalities. Salty water highly affects wave attenuation for radar, but has low effect for ultrasonic, resulting in a measurement as illustrated by FIG. 15a. The effect of air on wave attenuation is high for ultrasonic, but low for radar resulting in a measurement as illustrated by FIG. 15b. If the surrounding medium were oil, attenuation would be similar for both modalities and the result would be like FIG. 14b.

As the above example shows, reasonably consistent measurement results are obtained for the SA algorithm independent of the environment surrounding the hybrid sensor. This also applies to the previous example of pipe thickness measurements and other processing techniques such as Pulse Doppler processing. For the sake of clarity, it is noted that the images shown in FIGS. 14b, 15a and 15b are simulated and the depth scales are calibrated based on an assumed propagation velocity through concrete as determined from standard data tables. However, in a practical implementation of the invention, neither propagation velocity nor depth are known. What is known, however, is that the depths of identical artefacts imaged by ultrasound and radar pulses must of course be identical. As explained above, this allows derivation of two simultaneous equations having two unknown variables, such equations being solvable to determine both propagation velocity and range. Once the wave propagation velocity through the medium is known, the material of which the medium is formed may be inferred by cross-reference to suitable look-up tables.

Pulse Doppler, which is well known in the art of both the radar and ultrasound is used to measure the movement of a target, and is mostly used for estimating the velocity of an object relative to the radar or transducer. In the case of the SA algorithm previously explained, it may be used for Geometric Calibration, since the movement velocity of a target depends on the relative angle between the object and the movement direction of the measurement device. It may also be used to create doppler signatures to identify certain features of the surface or material composition that is measured upon. It might also be used simply to increase the clutter-to-signal ratio. These are all well-known techniques, but they all rely on the fact that the velocity of the propagating medium between the radar or transducer and the object is known. As long as the propagation velocity, pulse center frequency and sampling rate is known, the implementation of the pulse doppler algorithm is independent of whether the signal is generated by the radar or the ultrasonic sensor.

FIGS. 15a and 15b show processed synthetic aperture (SA) images for concrete containing three steel pipes, and the processed SA image after one of the steel pipes is replaced with air. The results simulate a block of concrete having cavities into which pipes of different material may be inserted and removed thereby replacing the cavity with air. The pipe replaced by air is clearly attenuated in the radar image, while on the other hand being amplified in the ultrasonic image. The hybrid sensor can therefore generally distinguish materials more effectively than a discrete sensor or combination of discrete sensors as previously proposed.

Figure 16A:
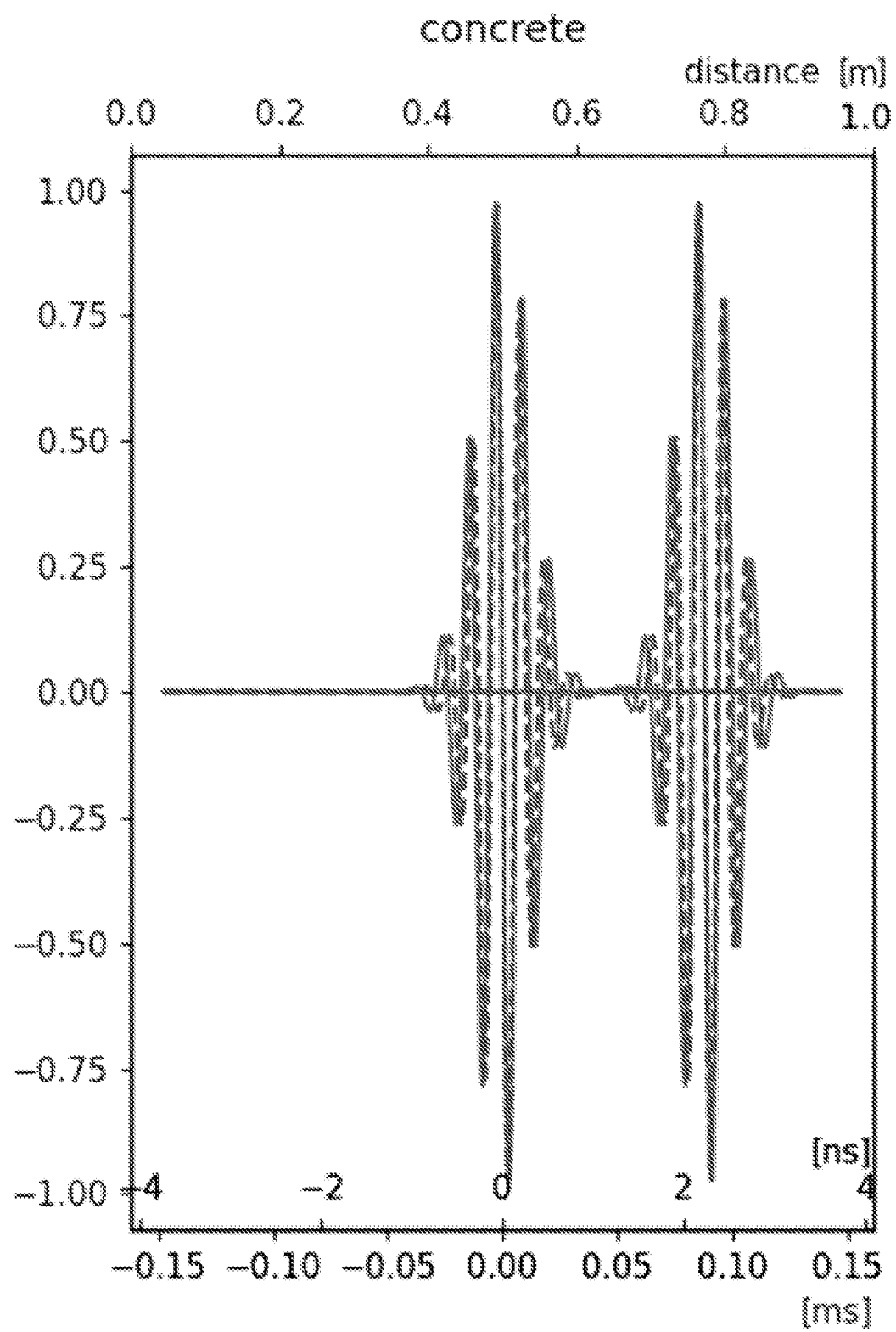
FIGS. 16a, 16b and 16c are graphical images showing radar and ultrasound responses plotted on a common time axis at different scales for concrete, water and air, respectively.
Figure 16B:
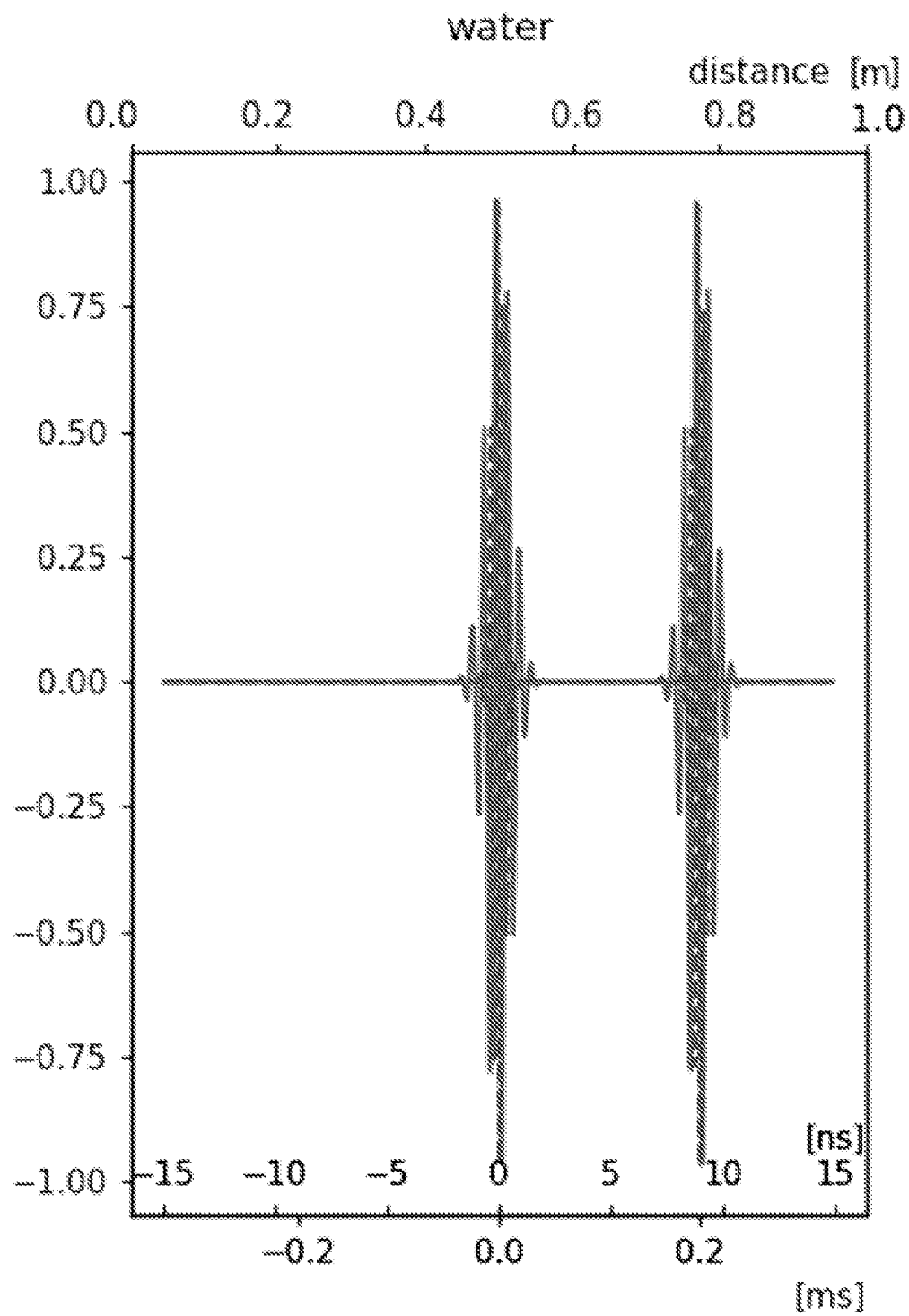
Figure 16C:
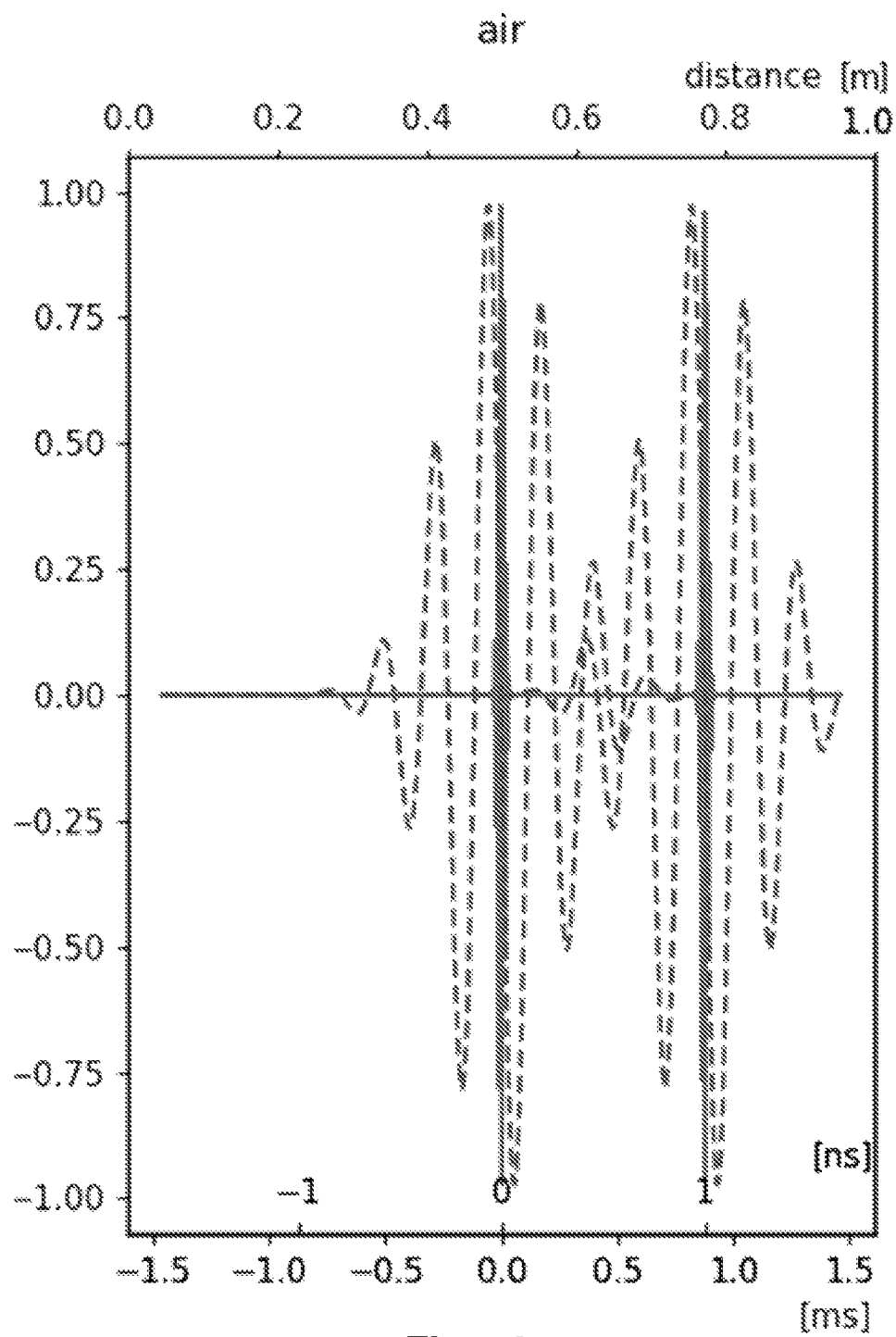

FIGS. 16a, 16b and 16c are graphical images showing radar and ultrasound responses plotted on a common time axis at different scales for concrete, water and air, respectively. The top axis is a measure of distance which is used to normalize the different time scales for the radar and ultrasonic time axis on the bottom side of the figure, i.e., the time required for the pulses of either modality to propagate this distance in a given medium. This normalization is relevant considering that for many applications, such as the SAR example above, the sensor is used to inspect a predefined length, width, and height of a material. These images illustrate the expected difference in resolution for the different sensor in different materials. The transceiver transmits pulses with the same frequency spectrum, but the material varies, and so does the receiver sampling rate to conform to the desired window of observation distance. In general, if the velocity is low the pulse gets shorter and may increase the resolution making it easier to distinguish one pulse from another. It is seen that for ultrasound the time axis extends from −0.15 to +0.15 ms, while for radar it extends from −4 to +4 ns. The radar response is plotted in dashed red line, while the ultrasound is plotted in continuous blue line. For readers seeing this in greyscale, the lines appear dashed and continuous. It is seen that although the time scales are displaced for the two waveforms, the waveforms are substantially identical in shape and amplitude meaning that the responses for radar and ultrasound are the same for concrete. In FIG. 16b where the responses are shown for water, the situation is vastly different.

Figure 17:
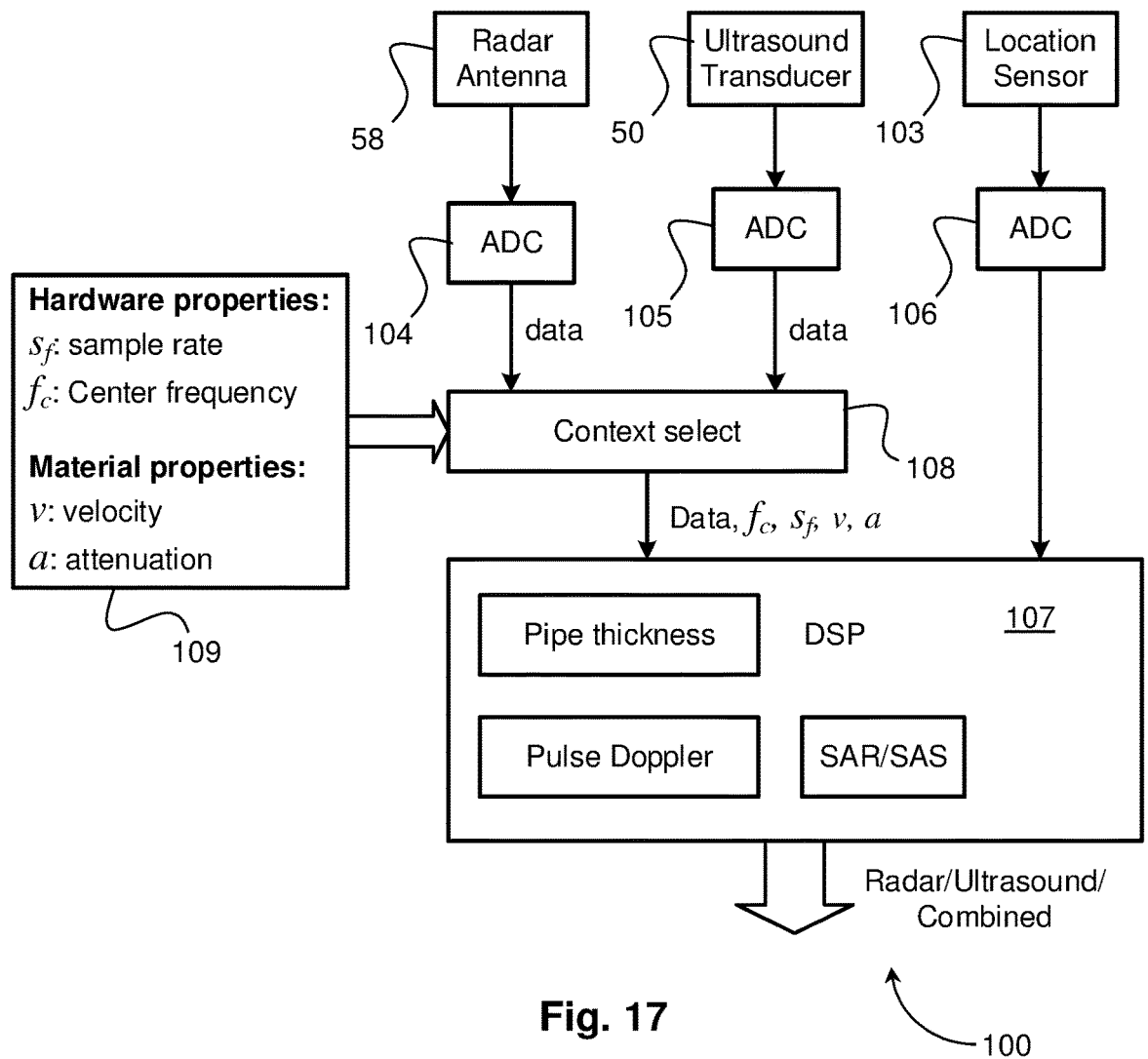
FIG. 17 is a block diagram showing a system for implementing synthetic aperture radar.

FIG. 17 is a block diagram showing a system 100 for implementing synthetic aperture radar. The output signals from the radar antenna 58, ultrasound transducer 51 and location sensors 103 are fed to respective analog-to-digital converters 104, 105 and 106. The digital location sensor signal is fed directly to a DSP 107, while the digital radar and ultrasound signals are fed via a context select unit 108, which is responsive to hardware and material properties that are extracted from a memory 109 according to the required measurement computation. Thus, for example, as noted above, pipe thickness may be computed according to:

$$\lambda_p = \frac{v_p}{f_c} \approx 2 d_p$$

There in order for the DSP to compute estimated pipe thickness, the context select unit feeds v and $f_c$ to the DSP. These values are typically stored in a memory that may be mounted on the PCB 38 of the sensor head (shown in FIG. 10). Alternatively, the data from the radar antenna and ultrasound transducer may be conveyed to a remote computer where the data are processed and the relevant measurements computed. In such case, the hardware and material properties may be stored in a memory within or accessible to the remote computer.

Figure 18:
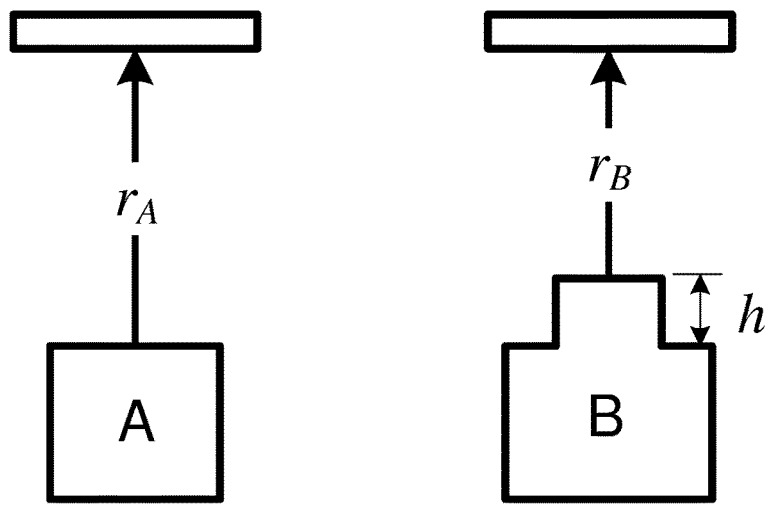
FIG. 18 is a schematic representation of a hybrid ultrasound and radar sensor configured to transmit pulses to a common target with a small round-trip path deviation.

FIG. 18 is a schematic representation of a hybrid ultrasound and radar sensor configured to transmit pulses to a common target with a small round-trip path deviation. Such an arrangement allows determination of both the range and wave velocity in a medium given two measurements at slightly different ranges by a setup consisting of two coaxial sensors with different wave velocities in the medium and a known offset in the axis of the ranging, given only the known offset and the wave travel times. For ease of computation, the sensors are treated as coaxial, i.e. their waves are emitted in the same direction. However, in practice there will be a known angular offset between the two sensors and this will need to be factored into the equation in a manner well within the skill of those versed in the art. The figure shows one view for each sensor, A and B, but in reality, they are superposed. The unknown range from sensor A to the reflector is $r_A$. Sensor B has a known offset h in the ranging direction from sensor A. Accordingly, the unknown range $r_B$ of sensor B is different from that of sensor A. Although in FIG. 18 the offset h is coaxial with the direction of pulse transmission, this also is only for ease of computation. In practice, the offset may be transverse as long as it gives rise to a known difference in the round-trip propagation of the two signals. For both sensors, the wave propagation speed in the medium between the sensor and the reflector is unknown.

It can be shown that the ranges are given by:

$$r_{A1} = \frac{1}{t_{A1}t_{B2} - t_{A2}t_{B1}}(t_{A1}t_{B2} - t_{A1}t_{B1})h \quad (1)$$

$$r_{A2} = \frac{1}{t_{A1}t_{B2} - t_{A2}t_{B1}}(t_{A2}t_{B2} - t_{A2}t_{B1})h \quad (2)$$

$$r_{B1} = \frac{1}{t_{A1}t_{B2} - t_{A2}t_{B1}}(t_{A2}t_{B2} - t_{A1}t_{B1})h \quad (3)$$

$$r_{B2} = \frac{1}{t_{A1}t_{B2} - t_{A2}t_{B1}}(t_{A2}t_{B2} - t_{A1}t_{B2})h \quad (4)$$

where: $r_{A1}$ and $r_{B2}$ are the ranges for sensor A at sampling times 1 and 2, respectively;

$r_{B1}$ and $r_{B2}$ are the corresponding ranges for sensor B; and $t_{A1}$, $t_{A2}$ $t_{B1}$, and $t_{B2}$ are the round-trip travel times for the pulses from the respective sensors at the respective times.

In general, the two ranges measured by each sensor should be different, i.e., $r_{A1}$ should not be the same as $r_{A2}$ and $r_{B1}$ should not be the same as $r_{B2}$. It follows from Equations (1) and (2) that $t_{A1}$ should therefore not be the same as $t_{A2}$; likewise, it follows from Equations (3) and (4) $t_{B1}$ should not be equal to $t_{B2}$.

It can likewise be shown that the wave propagation speeds are given by:

$$v_A = \frac{1}{t_{A1}t_{B2} - t_{A2}t_{B1}} 2(t_{B2} - t_{B1})h \quad (5)$$

$$v_B = \frac{1}{t_{A1}t_{B2} - t_{A2}t_{B1}} 2(t_{A2} - t_{A1})h \quad (6)$$

where $v_A$ and $v_B$ are the wave velocities of the respective sensors.

It is seen that in all of the above equations for range and wave velocity, a singularity arises when the denominator is zero, i.e. $t_{A1}t_{B2}=t_{A2}t_{B1}$. The measurements must thus be taken at slightly different ranges for sampling times 1 and 2. This requirement will normally be realized owing to slight asymmetries in the geometry, but in any case, the DSP may be programmed to check for this condition and skip any results for which it holds true, so as to avoid attempted division by zero.

Figure 19A:
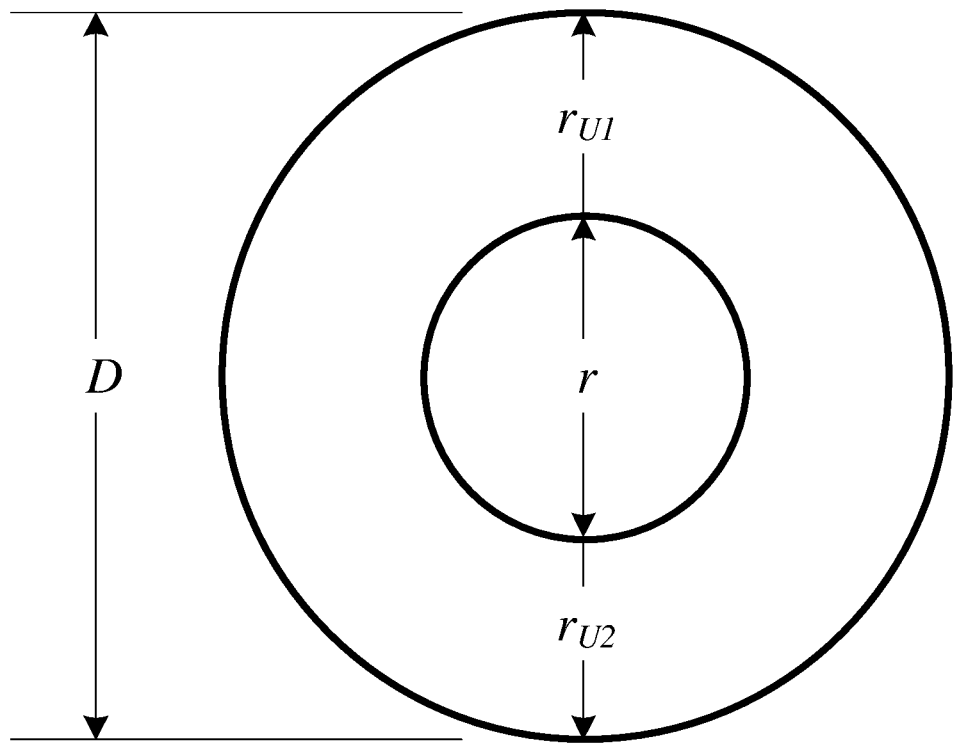
FIGS. 19a and 19b show schematically use of the hybrid sensor for determining range from radar and ultrasound transmitters to a pipeline internal wall surface.
Figure 19B:
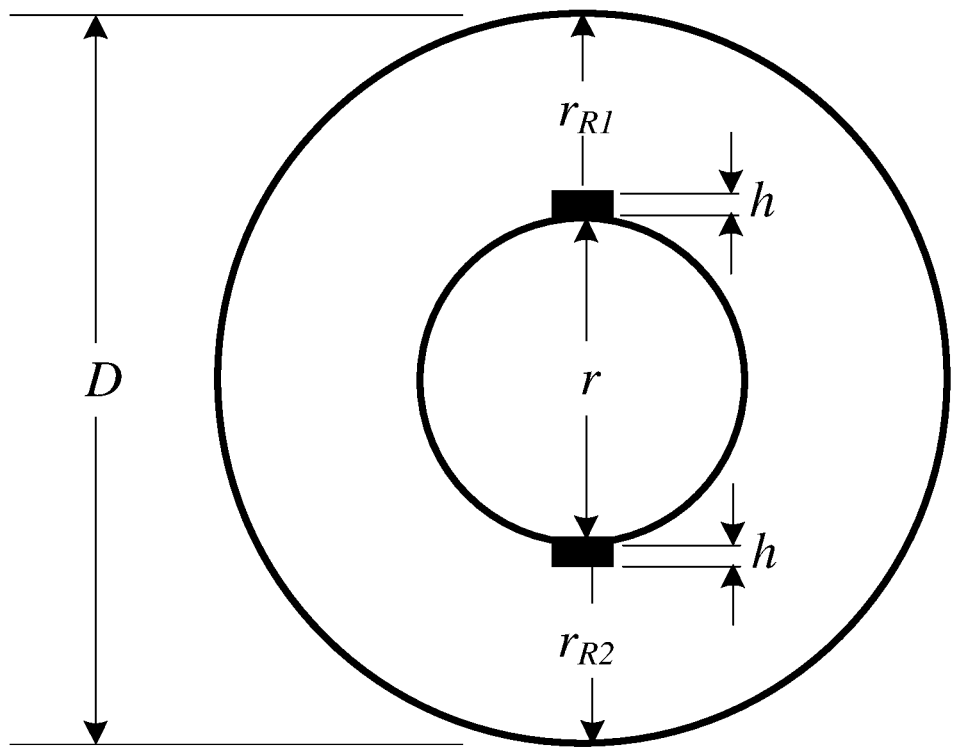

FIGS. 19a and 19b show schematically use of the hybrid sensor for determining range from radar and ultrasound transmitters to a pipeline internal wall surface. The measuring device is held close to the center of the pipe and has two pairs of sensors at opposing sides displaced by a known distance r. Each sensor pair consists of one radar and one ultrasound sensor, which we will denote as {R1, U1} and {R2, U2}. An advantage of having two sensor pairs is that sample times 1 and 2 can be practically identical. It is however required that the sensors of the same type have the same properties, i.e. the wave propagation times of R1 and R2 must be the same as must be the propagation times of U1 and U2. The ranging equation are as in (1) to (4):

$$r_{v1} = \frac{1}{t_{v2}t_{R1} - t_{v1}t_{R2}}(-t_{v1}t_{R1}h_1) \quad (7)$$

$$r_{v2} = \frac{1}{t_{v2}t_{R1} - t_{v1}t_{R2}}(-t_{v2}t_{R2}h_1) \quad (8)$$

$$r_{R1} = \frac{1}{t_{v2}t_{R1} - t_{v1}t_{R2}}(-t_{v2}t_{R1}h_1) \quad (9)$$

$$r_{R2} = \frac{1}{t_{v2}t_{R1} - t_{v1}t_{R2}}(-t_{v2}t_{R2}h_1) \quad (10)$$

The diameter, D, of the pipe can be determined once the ranges are known, since the sensor barrel diameter r is known:

$$D = r_{v1} + r_{v2} + r$$
$$= r_{R1} + h_1 + r_{R2} + r$$

Although the embodiments as described employ acoustic and radar sensors, the principle of the invention resides in the use of two different sensors that emit pulses having different propagation velocities through the material under inspection. Thus, the transceivers are not limited to ultrasound and radar and other types of signal should be suitable, such as laser. It is also envisaged that radar signals having different frequencies may be effective since their propagation times through a material will be different.

Likewise, although in the embodiments as described the two different transceivers in each pair are configured to operate in unison, this is not essential although it may simplify implementation. Thus, providing it can be ensured that the respective round-trip propagation distance for each of the different transceivers differs by a known amount, each transceiver type can be operated on its own to derive respective first and second datasets of propagation times and corresponding locations for the two transceivers. The two datasets may then be analyzed to extract at least two pairs of propagation times corresponding to an identical location for the two transceivers in each pair but different locations for each different pair of transceivers (as explained previously), thus enabling computation of the range and propagation velocity of each pulse through the medium.

Although embodiments have been described with regard to use of a robot to convey the sensor head along the inspection surface, it will be understood that the sensor head is independent of its mode of conveyance. In an alternative configuration, the sensor head was coupled to a box attached to a hand-held pole allowing the sensor head to be manually guided through a pipe. Stabilization wheels attached to the box allow it to run along the surface, while centering the sensor head within the pipe.

It will also be understood that the system according to the invention may employ a suitably programmed computer. Likewise, the invention contemplates a computer program being readable by a computer for executing the method of the invention. The invention further contemplates a machine-readable memory tangibly embodying a program of instructions executable by the machine for executing the method of the invention.

It should be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

The invention claimed is:

1. A hybrid sensor head for determining range or propagation speed of a pulse from a sensor to a surface through an intervening medium without requiring knowledge of material properties of the medium, the sensor head comprising:
   a casing supporting at least one pair of pulse transceivers, each transceiver having a respective first sensor (A) and second sensor (B) for respectively emitting pulses through the medium at respective propagation speeds $v_A$ and $v_B$ toward said surface and for receiving therefrom respective reflected pulses, the respective transceiver in each pair being configured to emit pulses to a common location of the surface and being mutually displaced by a known offset (h) measured in a direction of propagation of said pulses,
   at least one motor configured to rotate the transceivers about a common axis of rotation during propagation of the transceivers along the surface so as to direct said pulses radially to the axis of rotation to successive points along the surface,
   at least one positioning sensor for determining an instantaneous location in space of the respective transceiver in each pair,
   at least one processor coupled to the at least one positioning sensor, and to the respective transceivers in each pair, the at least one processor being configured to:
   (a) control the transceivers in each pair to direct pulses toward successive points along the surface and receive therefrom respective reflected pulses; and
   (b) measure respective propagation times for at least two pulses from each transceiver to travel to the surface and back to the respective transceiver;
   characterized in that:
   the at least one processor is configured to:
   (c) use respective propagation times of the at least two pulses from each transceiver directed to a respective common location of the surface at different times to compute either or both of:
   i) a range traversed by each pulse, as follows:

$$r_{A1} = \frac{1}{t_{A1}t_{B2} - t_{A2}t_{B1}}(t_{A1}t_{B2} - t_{A1}t_{B1})h$$

$$r_{B1} = \frac{1}{t_{A1}t_{B2} - t_{A2}t_{B1}}(t_{A2}t_{B2} - t_{A1}t_{B1})h$$

ii) a respective propagation speed of each pulse through the medium as follows:

$$v_A = \frac{1}{t_{A1}t_{B2} - t_{A2}t_{B1}} 2(t_{B2} - t_{B1})h$$

$$v_B = \frac{1}{t_{A1}t_{B2} - t_{A2}t_{B1}} 2(t_{A2} - t_{A1})h$$

where:

$r_{A1}$ and $r_{A2}$ are the ranges for sensor A at sampling times 1 and 2, respectively;

$r_{B1}$ and $r_{B2}$ are the corresponding ranges for sensor B;

$t_{A1}$, $t_{A2}$ $t_{B1}$, and $t_{B2}$ are the round-trip travel times for the pulses from the respective sensors at the respective times; and the two ranges and respective round trip propagation times measured by each sensor are different, i.e., $r_{A1} \neq r_{A2}$ and $r_{B1} \neq r_{B2}$ and $t_{A1} \neq t_{A2}$ and $t_{B1} \neq t_{B2}$.

2. The sensor according to claim 1, wherein each pair of pulse transceivers includes an ultrasonic transceiver and an impulse radar transceiver.

3. The sensor according to claim 1, where the at least one processor is further configured to:

(d) correlate the propagation velocity for each pulse with respective functions relating material properties of the medium to the velocity to determine which material property best fits the measured propagation velocity.

4. The sensor according to claim 3, where the at least one processor is further configured to:

(e) detect surface defects based on deviations in measured material properties of the medium as the sensor head is moved relative to the surface; and (f) identify a location of said defects based on an associated measurement from the positioning sensor.

5. The sensor head according to claim 1, further including at least one coupler at an end of the sensor head for coupling the sensor head to a robot.

6. The sensor head according to claim 4, wherein the coupler is configured to feed electric power and control signals to components in the sensor head.

7. The sensor head according to claim 5, wherein the coupler is configured for retrofitting to an off-the-shelf robot either directly or via a suitable adapter.

8. The sensor head according to claim 1, including a camera supported by a central rod at a forward end of the sensor head.

9. The sensor head according to claim 8, wherein the at least one motor inside the casing is configured to rotate the casing around the rod while maintaining the rod rotationally stationary.

10. The sensor head according to claim 7, wherein the at least one microcontroller is programmed to rotate the at least one motor at a speed that varies in accordance with an advance speed of the sensor head through the pipeline in order to ensure that the ultrasonic and RF signals scan a complete inner circumference of the pipeline as the sensor head progresses along the pipeline.

11. A pipeline inspection system comprising a robot coupled via coupler to the sensor head according to claim 1.

12. The pipeline inspection system according to claim 11, wherein the coupler is configured to feed electric power and control signals from the robot to components in the sensor head.

13. The pipeline inspection system according to claim 11, being configured to rotate the sensor head at a speed that varies in accordance with an advance speed of the robot through a pipeline in order to ensure that the ultrasonic and RF signals scan a complete inner circumference of the pipeline as the sensor head progresses along the pipeline.

14. A computer program product comprising a non-transitory computer-readable memory storing program code instructions, which when run on a computer processor are responsive to data relating to measurements of respective propagation times of at least two pulses from each of a pair of transceivers, respective pulses from each transceiver being directed to a respective common location of a surface through an intervening medium, said program code instructions being configured to use respective propagation times of the at least two pulses from each transceiver to compute either or both of:

i) a range traversed by each pulse, as follows:

$$r_{A1} = \frac{1}{t_{A1}t_{B2} - t_{A2}t_{B1}}(t_{A1}t_{B2} - t_{A1}t_{B1})h$$

$$r_{B1} = \frac{1}{t_{A1}t_{B2} - t_{A2}t_{B1}}(t_{A2}t_{B2} - t_{A1}t_{B1})h$$

ii) a respective propagation speed of each pulse through the medium as follows:

$$v_A = \frac{1}{t_{A1}t_{B2} - t_{A2}t_{B1}} 2(t_{B2} - t_{B1})h$$

$$v_B = \frac{1}{t_{A1}t_{B2} - t_{A2}t_{B1}} 2(t_{A2} - t_{A1})h$$

where:

h is a known offset between the respective transceivers in each pair as measured in a direction of propagation of said pulses;

$r_{A1}$ and $r_{A2}$ are the ranges for sensor A at sampling times 1 and 2, respectively;

$r_{B1}$ and $r_{B2}$ are the corresponding ranges for sensor B;

$t_{A1}$, $t_{A2}$ $t_{B1}$, and $t_{B2}$ are the round-trip travel times for the pulses from the respective sensors at the respective times; and the two ranges and respective round trip propagation times measured by each sensor are different, i.e., $r_{A1} \neq r_{A2}$ and $r_{B1} \neq r_{B2}$ and $t_{A1} \neq t_{A2}$ and $t_{B1} \neq t_{B2}$.

* * * * *